(12) United States Patent
Khan

(10) Patent No.: US 12,496,203 B2
(45) Date of Patent: Dec. 16, 2025

(54) OSTIAL STENTING UNDER VISION

(71) Applicants: National Guard Health Affairs, Riyadh (SA); King Saud bin Abdulaziz University for Health Sciences, Riyadh (SA); King Abdullah International Medical Research Center, Riyadh (SA)

(72) Inventor: Muhammad Fayaz Khan, Riyadh (SA)

(73) Assignees: National Guard Health Affairs, Riyadh (SA); King Saud bin Abdulaziz University for Health Sciences, Riyadh (SA); King Abdullah International Medical Research Center, Riyadh (SA)

( * ) Notice: Subject to any disclaimer, the term of this patent is extended or adjusted under 35 U.S.C. 154(b) by 701 days.

(21) Appl. No.: 17/949,798

(22) Filed: Sep. 21, 2022

(65) Prior Publication Data

US 2023/0098512 A1 Mar. 30, 2023

Related U.S. Application Data

(60) Provisional application No. 63/249,258, filed on Sep. 28, 2021.

(51) Int. Cl.
*A61F 2/958* (2013.01)
*A61F 2/90* (2013.01)
(Continued)

(52) U.S. Cl.
CPC .............. *A61F 2/958* (2013.01); *A61F 2/90* (2013.01); *A61F 2/954* (2013.01); *A61F 2/97* (2013.01); *A61B 8/12* (2013.01); *A61B 8/4461* (2013.01); *A61B 8/56* (2013.01); *A61F 2002/821* (2013.01); *A61F 2250/0067* (2013.01); *A61F 2250/0071* (2013.01); *A61F 2250/0098* (2013.01)

(58) Field of Classification Search
CPC .......... A61F 2/95–97; A61F 2250/0093–0095; A61F 2250/0048; A61F 2002/821; A61F 2/82–945
See application file for complete search history.

(56) References Cited

U.S. PATENT DOCUMENTS 6,168,621 B1 * 1/2001 Vrba ...................... A61F 2/915
623/1.2
6,740,113 B2 5/2004 Vrba
(Continued)

OTHER PUBLICATIONS

Robert J. Applegate, et al., "Restenosis of a sirolimus drug-eluting stent: Aorto-ostial involvement of the proximal right coronary artery", Catheterization and Cardiovascular Interventions, vol. 67, Issue 3, Feb. 10, 2006, pp. 391-395 (Abstract only).
(Continued)

*Primary Examiner* — Rebecca S Preston
(74) *Attorney, Agent, or Firm* — Oblon, McClelland, Maier & Neustadt, L.L.P.

(57) ABSTRACT

A system comprising a stent and a stent delivery device configured with a tiny intravascular ultrasound ("IVUS") transducer on the tip of a delivery catheter which can image the interior of blood vessels. Methods for treating ostial or bifurcated lesions using the system.

19 Claims, 10 Drawing Sheets

(51) Int. Cl.
*A61F 2/954* (2013.01)
*A61F 2/97* (2013.01)
*A61B 8/00* (2006.01)
*A61B 8/12* (2006.01)
*A61F 2/82* (2013.01)

(56) References Cited

U.S. PATENT DOCUMENTS

| | | |
|---|---|---|
| 6,945,994 B2 | 9/2005 | Austin et al. |
| 7,037,269 B2 | 5/2006 | Nix et al. |
| 7,037,327 B2 | 5/2006 | Salmon et al. |
| 7,524,289 B2 | 4/2009 | Lenker |
| 7,527,594 B2 | 5/2009 | Vardi et al. |
| 10,226,597 B2 | 3/2019 | Millett |
| 10,327,924 B2 | 6/2019 | Kelly |
| 10,512,449 B2 | 12/2019 | Rice |
| 2005/0228483 A1* | 10/2005 | Kaplan .................. A61F 2/958 623/1.15 |
| 2007/0135886 A1 | 6/2007 | Maschke |
| 2008/0058917 A1* | 3/2008 | Klingenbeck-Regn ...................... A61B 5/06 623/1.11 |
| 2008/0188740 A1* | 8/2008 | Diaz .................. A61B 8/0833 600/424 |
| 2012/0041533 A1 | 2/2012 | Bertolino |
| 2012/0158119 A1* | 6/2012 | Kitaoka .................. A61F 2/966 623/1.11 |
| 2013/0345790 A1* | 12/2013 | Cottone .................. A61F 2/915 623/1.16 |
| 2015/0257732 A1* | 9/2015 | Ryan .................... A61B 5/1076 600/407 |
| 2018/0228626 A1 | 8/2018 | Kelly |

OTHER PUBLICATIONS

Tarek A. Hemly, et al., "Coronary and peripheral stenting in aorto-ostial protruding stents: The balloon assisted access to protruding stent technique", Catheterization and Cardiovascular Interventions, vol. 87, Issue 4, Nov. 30, 2015, pp. 735-741 (Abstract only).

Konstantinos D. Rizas, et al., "Stent polymers: Do they make a difference?", Circulation: Cardiovascular Interventions, vol. 9, No. 6, pp. 1-13.

* cited by examiner

SECTION A-A'

SECTION B-B'

OSTIAL STENTING UNDER VISION

CROSS-REFERENCE TO A RELATED APPLICATION

This application claims priority to U.S. Provisional Application No. 63/249,258, filed Sep. 28, 2021, which is incorporated by reference for all purposes.

BACKGROUND OF THE INVENTION

Field of the Invention

The invention pertains to the fields of interventional cardiology, interventional peripheral radiology, and neuro-intervention. The invention relates to a safer and more accurate way to treat ostial and bifurcation lesions using an ultrasound probe embedded into an intravascular stent delivery system.

Description of Related Art

Cardiovascular disease is one of the largest health problems in the developed world. One of the more serious forms is Coronary Artery Disease (CAD), which typically occurs when part of the smooth, elastic lining inside a coronary artery becomes hardened, stiffened, and swollen with calcium deposits, fatty deposits, and/or abnormal inflammatory cells, leading to the formation of a plaque. This plaque can create an obstruction (known as a stenosis or a lesion) in an artery thereby blocking or restricting the normal supply of oxygenated blood to the heart muscle. This in turn can cause chest pain (angina), and ultimately can lead to increased cardiovascular events including myocardial infarction and cardiovascular mortality.

Typical treatment of such lesions involves the placement of a support structure which holds the artery open to allow for continued blood flow and oxygen supply. The support structure is known as a stent.

Currently-used stents were designed to treat lesions in straight arteries or other bodily vessels. Many lesions, however, occur at bifurcation sites where one artery branches into two arteries. Due to changes in vessel geometry and blood flow characteristics, the bifurcation site is a more complex location to stent compared to a straight vessel. Often, major adjustments in designing a stent are necessary to adequately cover the target territory at an ostium or bifurcation site. This raises concerns regarding optimal treatment using stents such as difficulties in the use of two dedicated stents for the branches after the bifurcation site, stent distortion, which may lead to strut fractures or dislodging of the stent, and an increased risk of periprocedural myocardial infarction; Lesiak, M., 2016, INTER V. CARDIOL, 2016, 11, 2, 124-127.

These issues create a great need for ostial or bifurcation stents which must be easy to use, effective in various lesion morphologies, and safe. One such bifurcation stent should be sufficient to stent a side branch at a bifurcation site. A straight, tubular stent will not suffice for such a purpose.

Balloon-expandable stents require mounting over a balloon, positioning, and inflation of the balloon to expand the stent radially outward. In contrast, self-expanding stents expand into place when unconstrained, without requiring assistance from a balloon. A self-expanding stent is biased so as to expand upon release from the delivery catheter.

Hybrid stents have characteristics of both self-expanding and balloon-expandable stents. Almost all stents used in the treatment of coronary atherosclerosis are balloon-expandable, while self-expanding stents are typically used in larger blood vessel in the limbs and periphery.

Stents are usually made of a metal mesh composed of various metals and alloy combinations. Some stents comprise a plastic mesh-like material while other stents comprise a combination of metal and a synthetic lining material like polytetrafluoroethylene (PTFE) and are called stent grafts and are used in larger arteries. Stents may be constructed from a variety of materials including stainless steel, Co—Cr—Ni Alloys like Elgiloy®, Ni—Ti alloys like Nitinol®, shape memory alloys, or shape memory polymers like thermoplastic polyurethane.

Stents are formed in different ways. A stent may be formed by etching or cutting a stent pattern from a tube or section of stent material; a sheet of stent material may be cut or etched according to a desired stent pattern whereupon the sheet may be rolled or otherwise formed into the desired tubular or bifurcated tubular shape of the stent; one or more wires or ribbons of stent material may be braided or otherwise formed into a desired shape and pattern.

Stenting is conventionally used to widen a clogged artery. However, stenting becomes more complex when an artery is bifurcated or branched. Repair of a diseased bifurcated coronary vessel is particularly challenging since the stent must be precisely positioned, provide adequate coverage of diseased or damaged portions of the vasculature, provide access to any diseased area located distal to the bifurcation, and maintain vessel patency in order to allow adequate blood flow to reach the myocardium.

This complexity is further compounded because a coronary angiogram generally does not adequately visualize lesions in an aorto-ostial location required for accurate deployment of stenting and stent over protrusion and/or insufficient coverage of an ostial lesion are common problems. Moreover, it is not easy to visualize the ostia of the coronary arteries, especially those of the right coronary artery ("RCA").

Conventional stents and stenting system are generally not designed to treat ostial or bifurcation lesions. For example, U.S. Pat. No. 10,327,924 describes a stent placement device that is designed to treat an aneurysmal artery, but not bifurcation lesions. The device is covered with layers of a biocompatible fabric or other graft material and has a self-expandable center portion and two expandable balloon components at each.

US 2018/0228626 describes a stent, such as a bridging stent, designed to treat aneurysmal arteries especially. The stent made only of self-expandable material and has retention mechanism, but it requires a "graft" which is a cylindrical liner that may be disposed on the stent's interior, exterior or both. Moreover, it has a complex deployment mechanism where initial balloon inflation is used to deploy a distal anchor and then a retractable mechanism is used to deploy the self-expandable graft stent.

U.S. Pat. No. 6,740,113 describes a device for treating bifurcation lesions. The device has a flaring proximal (trumpet-shaped) part made of Nitinol® and has a balloon expandable part residing on a side branch. It has a self-expandable part which is constrained in a deliverable form and a complex or bulky retractable sheath which releases the self-expanding portion. This design requires release of the self-expanding section of the stent first prior to release of the balloon expandable part.

U.S. Pat. No. 7,037,327 describes a hybrid stent having a balloon-expandable part in the center and two self-expandable parts at each end. The hybrid stent has an overlapping nested structure with a middle balloon expandable stent placed inside of and co-axially with a longer self-expanding stent.

U.S. Pat. No. 6,945,994 discloses a stent comprising at least two balloon expandable segments (which are not self-expanding) and a plurality of self-expanding sections wherein the end segments are balloon expandable. It lacks features required for accurate stenting of bifurcation lesions.

Simultaneous deployment and assessment of stent placement is a crucial part of a stent treatment. While conventional intravascular imaging helps with placement for stent deployment, currently available technologies do not provide for simultaneous assessment of stent placement coupled with stent deployment under vision. Due to the increased complexity of stent placement in or around ostia, this lack of simultaneous imaging of placement and deployment often leads to inaccurate installation of an ostial stent. For example, in bifurcated lesions, such as in an ostial lesion of the left anterior descending artery ("LAD"), it is crucial to cover the entire ostium while at the same time not compromising the ostium of the circumflex artery ("CX") to avoid unnecessary protrusion of a stent into the left main ("LM") coronary artery. Too much protrusion of the LAD stent into the LM risks mal-apposition, delayed endothelialization, and increases the risk of stent thrombosis.

LM stenting procedures are of paramount importance due to their profound effect on a patient's outcome. While angiographic assessment of ostial LM coronary artery is usually adequate it has its limitations, for example, in difficult or convoluted anatomical cases where an angiogram fails to adequately visualize the lesion.

In view of the limitations of conventional stent placement devices and deployment methods, the inventors sought to design a device having an inbuilt imaging modality and which permits a stent to be easily be positioned and deployed under direct vision thus reducing the risk of stent misplacement. The device also has a self-deployment feature that permits stenting across an ostium in a parent vessel and deploying a stent into a diseased daughter vessel. These features reduce risk of ostial stent placements, provide a better long term result for the patient and provide easier access to the artery when future intravascular work is required.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

One aspect of the invention is a system comprising a stent and a stent delivery device configured with a tiny intravascular ultrasound ("IVUS") transducer on the tip of a delivery catheter which can image the interior of blood vessels, see FIG. 1A. This embodiment typically comprises a single balloon-expandable stent segment and preferably includes the other elements described by FIG. 1A.

Another aspect of the invention is a system comprising a hybrid (or bifunctional) stent and a stent delivery device configured with a tiny intravascular ultrasound ("IVUS") transducer on the tip of a delivery catheter which can image the interior of blood vessels, see FIG. 1B. This embodiment typically comprises a proximal self-expanding segment and a more distal balloon-expandable stent segment, cleavable cover typically around only the self-expandable portion, and preferably includes the other elements described by FIG. 1B.

The hybrid stent comprises a self-expanding section as well as a balloon-expandable segment. The self-expanding section can be used to stent around an ostium in a parent vessel and the balloon-expandable segment to stent a side- or daughter-vessel as shown by FIG. 7.

The IVUS tip is used to assess vessel or lumen diameter and lesion length, to determine the composition and volume of plaque within the arterial, the degree of stenosis in a vessel, and to verify whether a stent has been properly placed and fully deployed. After a stenting procedure IVUS can be used to check the effectiveness of angioplasty.

The invention also pertains to a covered hybrid stent having a self-expanding proximal (to the surgeon) portion that can stent a parent vessel around an ostium and a distal balloon-inflatable portion that can stent a daughter or side-branch of the ostium, as shown by FIG. 7. Preferably, this hybrid stent may further include a drug coating. Both the self-expanding and balloon-expandable portions can be deployed by inflating the balloon thus cleaving the stent cover and releasing the self-expanding section of the stent and simultaneously expanding the balloon-expandable portion of the stent.

Another aspect of the invention is a simpler, safer and visually transparent stenting procedure for treatment of ostial lesions and other bifurcation lesions using the stent and stent delivery system disclosed herein.

Specific embodiments of the invention include, but are not limited to the following.

One aspect of the invention is an intravascular stenting system comprising a catheter having a fluid-filled lumen, a guidewire, at least one intravascular ultrasound ("IVUS") transducer, and a stent comprising a distal balloon-expandable segment; wherein the fluid-filled lumen is operatively connected to an inflation device at its proximal end and at its distal end to a balloon inside of the stent; wherein a distal segment of the catheter comprises a guidewire port through which the guidewire extends into a distal portion of the lumen, wherein the lumen comprises one or more fiber optic lines operably connected to the IVUS transducer. In some embodiments, the stent is contained within a cover that is cleavable by inflation of the balloon.

Another aspect of the invention is an intravascular stenting system comprising a catheter having a fluid-filled lumen, a guidewire, at least one intravascular ultrasound ("IVUS") transducer, and a stent comprising a proximal self-expanding section and a distal balloon-expandable segment; wherein the fluid-filled lumen is operatively connected to an inflation device at its proximal end and at its distal end to a balloon inside of the stent; wherein a distal segment of the catheter comprises a guidewire port through which the guidewire extends into a distal portion of the lumen, wherein the lumen comprises one or more fiber optic lines operably connected to the IVUS transducer, and wherein the stent is contained within a cover that is cleavable by inflation of the balloon.

In one embodiment of this system, the stent further comprises a drug coating on the proximal self-expanding section and/or a distal balloon-expandable segment. The drug coating may comprise at least one drug selected from the group consisting of everolimus, zotarolimus, sirolimus and biolimus.

In another embodiment of this system, the catheter further comprises markings visible, tactile or other perceptible markers on its external surface, such as 0.5, 1.0 or 2.0 mm scale markings on its external surface. These and other ranges herein include all intermediate values and subranges.

In another embodiment of this system, the catheter has an outer diameter ranging from about 0.5, 1, 2, 3 to 4.0 mm and an inner lumen diameter ranging from about 0.3, 0.5, 1, 2, 3 to 3.5 mm, wherein the fiber optic lines range in diameter from 0.1, 0.2, 0.3, 0.4 to 0.5 mm, and wherein the guidewire ranges in diameter from 0.2, 0.3, 0.4 to 0.5 mm. These and other ranges herein include all intermediate values and subranges.

In another embodiment of this system, the catheter and/or stent has at least one, two, three, four, five or more radiopaque markings.

In one embodiment, the stent has a first radiopaque marking (122) about 0.5, 1.0, 1.5 to 2.0 mm (D1) distal to the IVUS transducer, a second radiopaque marking (124) at a proximal edge of the stent at a distance of 1, 2, 3, 4 to 5 mm (D2), and a third radiopaque marking at a distal edge of the stent. In embodiments with a self-expanding section another radiopaque marking (125) can be placed at a junction of the self-expanding section and balloon-inflatable section.

In other embodiments of this system, the at least one IVUS transducer comprises a single rotating IVUS transducer or the catheter comprises a fixed array of at least two IVUS transducers.

In on some embodiments of this system, the balloon is longer than the stent and has ends that protrude beyond the length of the stent such as 0.1, 0.2, 0.3, 0.4 or 0.5 mm, the balloon is present only inside of the balloon-expandable segment of the stent, or the balloon is inside of both the self-expanding and balloon-expanding section or segment of the stent.

In another embodiment of this system the balloon-expandable segment and self-expanding section of the stent have an undeployed diameters ranging from 0.5, 1, 2, 3, 4, 5 to 6 mm and deployed diameters ranging from 2, 3, 4, 5, 6, 7 to 8 mm, and together having a length ranging from 5, 10, 20, 30, 40, 50, to 60 mm These and other ranges herein include all intermediate values and subranges.

In one embodiment of the system, the self-expanding section of the stent and/or the stent cover comprises nickel-titanium, platinum or a platinum alloy, a cobalt-chromium alloy, or a platinum-chromium alloy.

In some embodiments, the self-expanding section self-expands by a shape-memory effect.

In some embodiments, the self-expanding section comprises a shape-memory alloy that is a Nitinol® or a generic equivalent.

In another embodiment of the system the self-expanding section of the stent flares into a trumpet-shape that has a proximal trumpet bell portion having a larger diameter than the expanded balloon-expandable segment.

In other embodiments, the fiber optic lines are operably connected to an interface which processes data from the IVUS transducer into an image and/or a monitor that displays the image.

Another aspect of the invention is method for treating an ostial or other bifurcated intravascular lesion, comprising inserting the intravascular stenting system as disclosed herein into the vascular system of a patient, observing or locating the lesion by IVUS, and stenting the lesion by inflating the balloon to cleave the covering, and removing the catheter.

One embodiment of this method further comprises assessing stent placement by IVUS after deployment of the stent.

Another embodiment of this method further comprises implanting the stent in a daughter-vessel ostium followed by stenting of the parent-vessel across the daughter-vessel.

In some embodiments of this method comprises treating aorto-ostial or more proximal lesion.

In another embodiment of this method she stent has a drug coating comprising at least one selected from the group consisting of everolimus, zotarolimus, sirolimus and biolimus.

Preferably, the stent delivery assembly further comprises one or more radiopaque markers.

In some embodiments, the bifunctional expandable stent further comprises a drug-containing coating.

In some embodiments, the drug-containing coating comprises a polymer and an antiproliferative drug.

In some embodiments, the antiproliferative drug is at least one selected from the group consisting of everolimus, zotarolimus, sirolimus, and umirolimus.

In some embodiments, the ostium or bifurcation site comprises a side branch lesion.

In some embodiments, the ostium or bifurcation site has a bifurcation lesion having a Medina classification of (X, Y, 1), where X=0 or 1 and Y=0 or 1.

In some embodiments, the method comprises implanting the stent in a daughter-vessel and stenting the parent-vessel across the daughter-vessel ostium.

In other embodiments, the method is used to treat an ostial or other bifurcated lesion, wherein the lesion is an aorto-ostial or more proximal lesion.

In some embodiments, the balloon-expandable segment is oriented in a side branch of the bifurcation site or near a carina of the bifurcation site.

In some embodiments, the balloon-expandable segment is oriented in a side branch of the bifurcation site and a balloon-expandable trumpet segment is located at the carina of the bifurcation site.

In some embodiments, the balloon-expandable segment is oriented in a side branch of the bifurcation site and a self-expandable trumpet segment is located at the carina of the bifurcation site.

In some embodiments, the method further comprises expanding the balloon-expandable body segment and the self-expandable trumpet section to a diameter less than the critical diameter thereby not breaking the breakable cover and not allowing the self-expandable trumpet portion to self-expand.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings below.

Figure 1A:
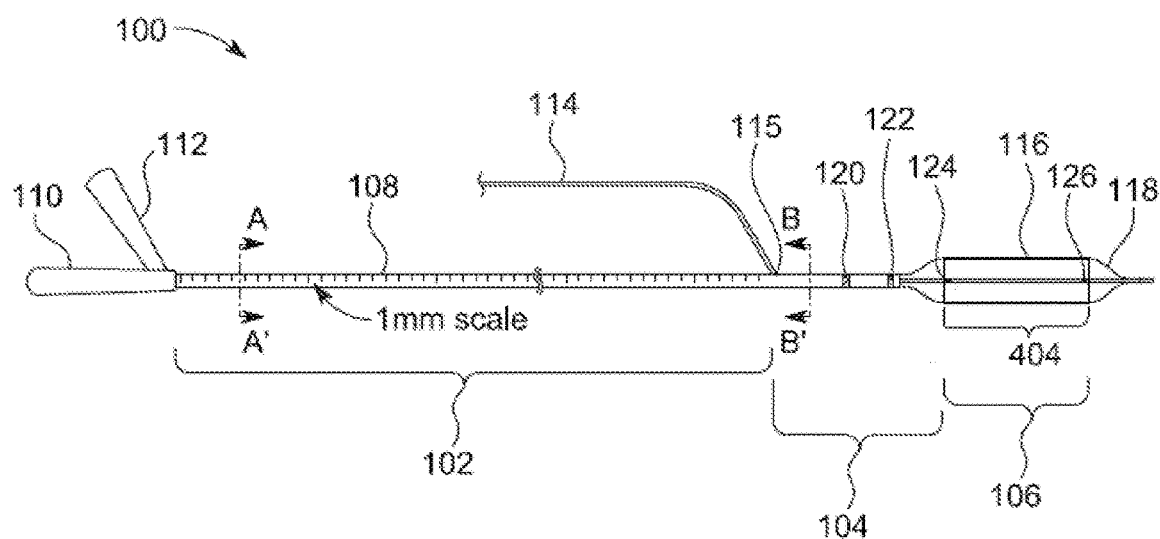
FIG. 1A. Side view of the non-hybrid stent delivery system 100. Segments A, B and C are indicated respectively by 102, 104 and 106.

Cross-sections of Segment A and Segment B are taken at A-A' and B-B' and are shown in FIGS. 2 and 3.

The proximal end (to the surgeon) of the device has a connector 110 to an inflation device and an IVUS connector 112.

Segment A 102 comprises a catheter 108 with scale markings and at a distal end an exit port 115 for guidewire 114.

Segment B 104 comprises an IVUS transducer 120 and a first radiopaque marker 122 which is 1 mm distal to the IVUS at the start of the balloon shoulders.

Segment C 106 comprises a second radiopaque marker 124 which is 1 mm distal to first marker 122, the undeployed stent 116 and cleavable cover 400, balloon 118 and a third radiopaque marker 126 at the distal end of the stent.

Figure 1B:
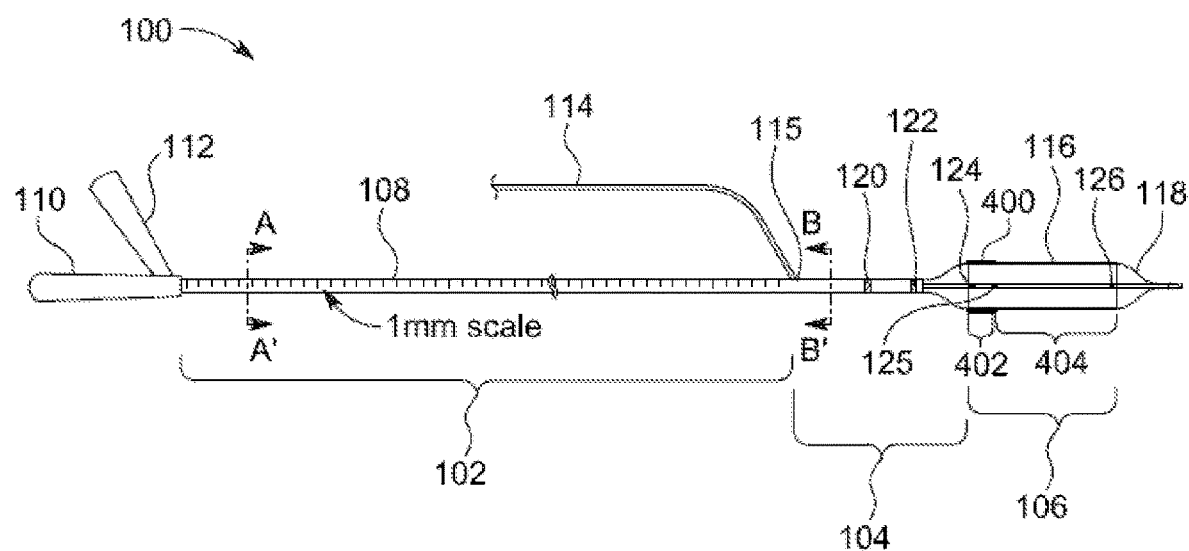

FIG. 1B. Side view of a hybrid stent delivery system 100. Segments A, B and C are indicated respectively by 102, 104 and 106. The proximal end (to the surgeon) of the device has an inflation device connector 110 and IVUS connector 112. Segment A comprises a catheter 108 and at a distal end an exit port for guidewire 114.

Segment B comprises an IVUS transducer 120 and a first radiopaque marker 122, 1 mm distal to the IVUS at the start of the balloon shoulders.

Segment C comprises a second radiopaque marker 124 which is 1-5 mm distal to first marker, a radiopaque marker 125 between sections 402 and 404, the undeployed stent 116, balloon 118 and a fourth radiopaque marker 126 at the distal end of the stent. The self-expanding portion of the hybrid stent 402 is typically made of Nitinol and is integrally linked to a balloon-expandable portion 404 made of a balloon-expandable alloy. Radiopaque marker 125 is set between segments 402 and 404. Segment 402 is contained within a cleavable cover 400; segment 404 is expanded by the balloon.

Figure 2A:
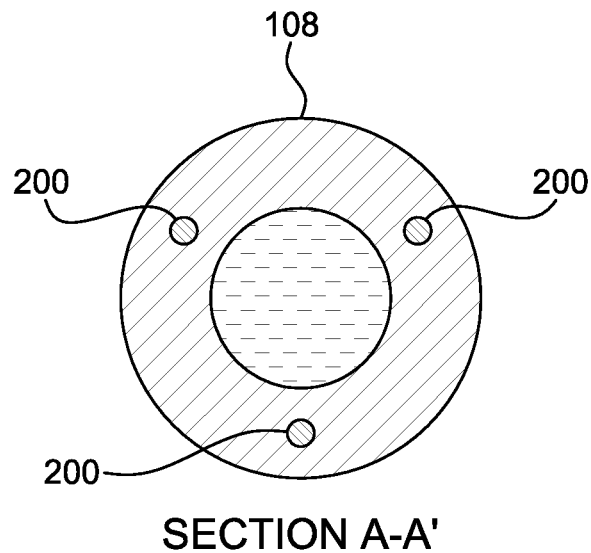

FIG. 2A depicts an A-A' cross section in Segment A. It also shows catheter 108, IVUS fiber optics 200.

Figure 2B:
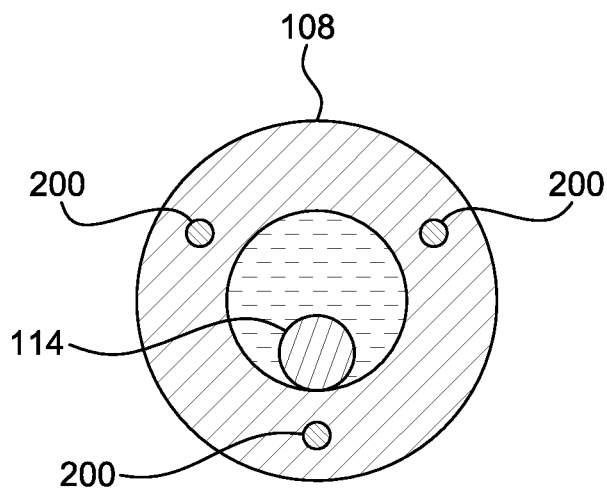

FIG. 2B shows a B-B' cross section in segment B and depicts catheter 108, IVUS guidewire 114, and fiber optics 200.

Figure 3A:
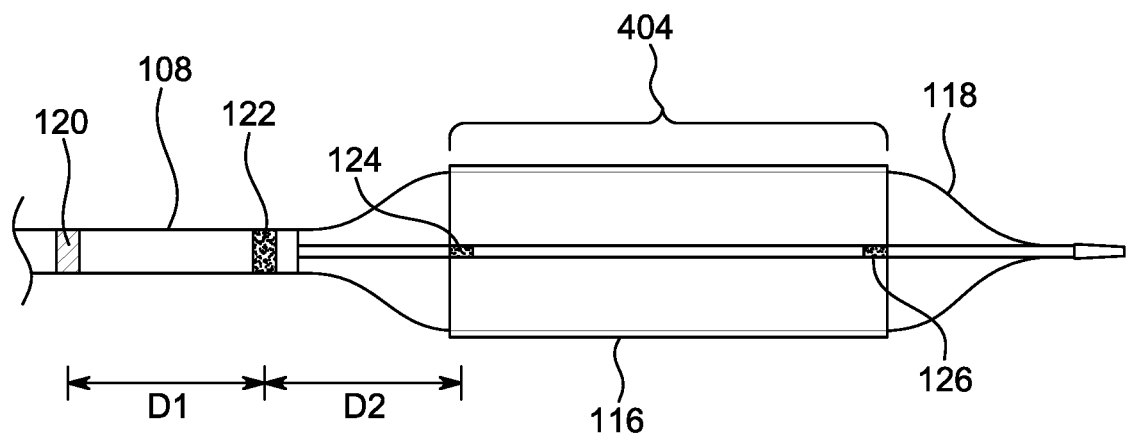

FIG. 3A details elements of the distal end of a non-hybrid device including IVUS transducer 120, catheter 108, D1-distance between IVUS and the first radiopaque marker, first radiopaque marker 122, D2-distance between the first radiopaque marker and the second radiopaque marker, second radiopaque marker 124, stent 116, balloon 118, balloon-expandable portion 404, and third and most distal radiopaque marker 126.

Figure 3B:
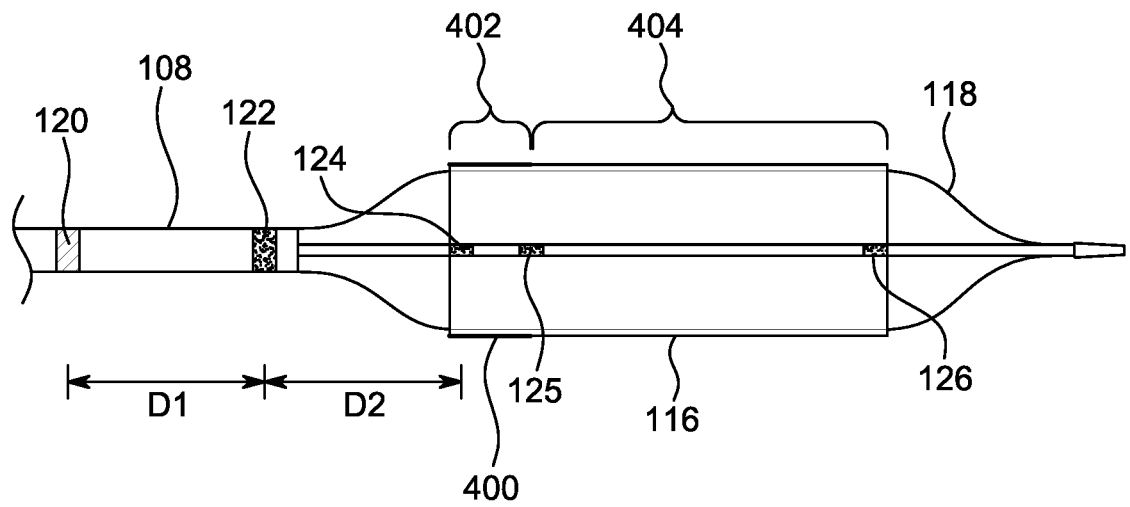

FIG. 3B details elements of the distal end of a hybrid device including IVUS transducer 120, catheter 108, D1-distance between IVUS and the first radiopaque marker, first radiopaque marker 122, D2-distance between the first radiopaque marker and the second radiopaque marker, second radiopaque marker 124, third radiopaque marker 125, stent 116, balloon 118, self-expandable portion 402, balloon-expandable portion 404 and third most distal radiopaque marker 126.

Figure 4A:
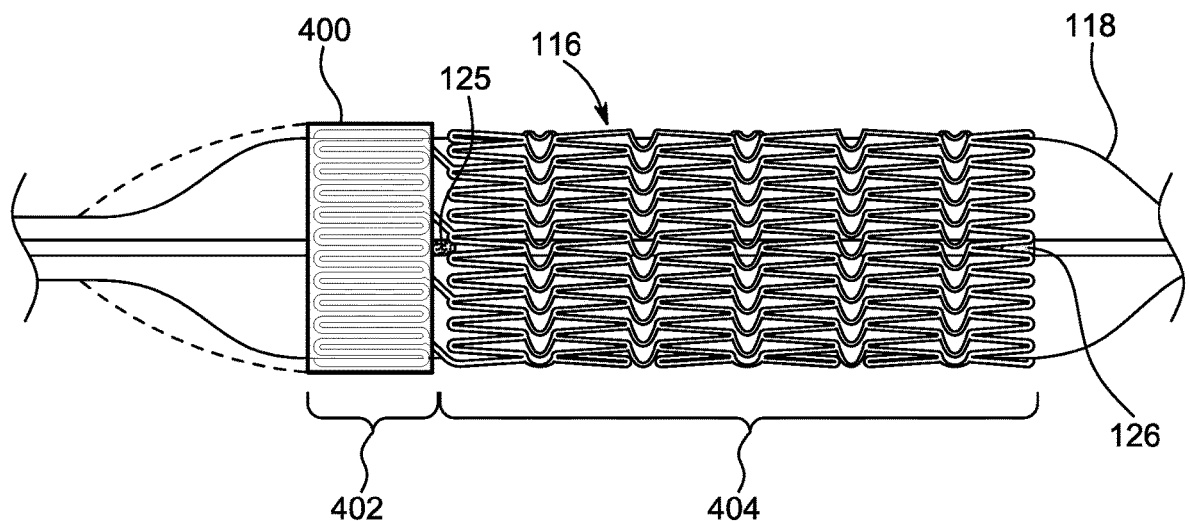

FIG. 4A details cleavable cover 400 which covers the self-expanding portion 402 and which is attached to the shaft (dotted lines) to permit its removal after deployment of the stent. Third radiopaque marker 125 is placed between sections 402 and 404. The distal balloon expandable section is identified in 404. Unlike self-expanding section 402, the expansion of the stent in section 404 is forced by the inflation of the balloon. Stent 116, balloon 118, and fourth and most distal radiopaque marker 126 are also shown.

Figure 4B:
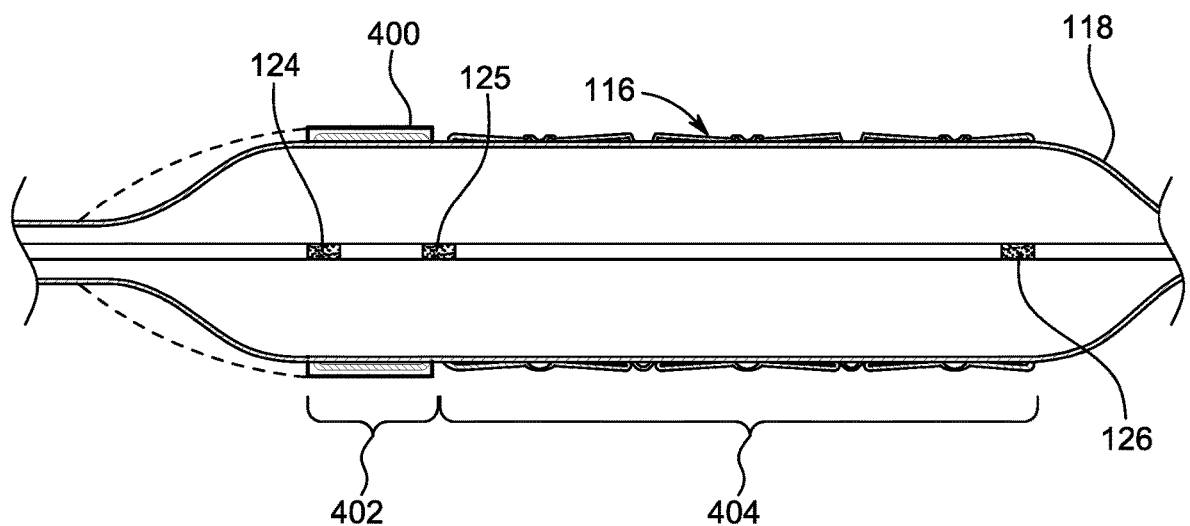

FIG. 4B provides a cross-sectional view of the distal portion. Stent 116 is wrapped around balloon 118. Cleavable cover 400 is wrapped around the self-expanding segment of the stent 402 and is attached to the shaft (dotted lines) to permit its removal after deployment of the stent. Radiopaque marker 125 is placed between sections 402 and 404 and radiopaque marker 126 is aligned with the distal edge of the stent.

Figure 5A:
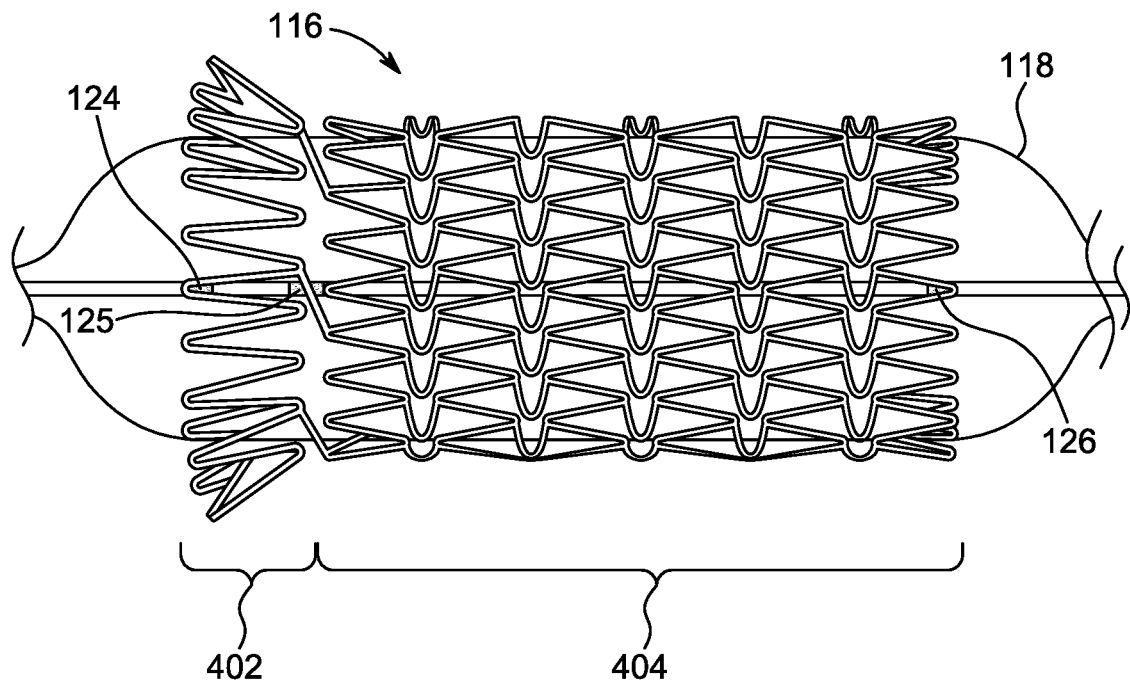

FIG. 5A shows a lateral view of a hybrid stent 116 comprising markers 124, 125, and 126, self-expandable portion 402 and balloon-expandable portion 404. As illustrated, all of the stent is on the body of balloon 118 which helps assure proper deployment of the stent. The self-deploying section of the stent 402 is covered by a cleavable cover shown in FIGS. 4A and 4B and is attached at its proximal end to the catheter so that it can be retrieved easily after deployment. Radiopaque marker 125 denotes the intersection of sections 402 and 404 and marker 126 the distal end of the stent.

Figure 5B:
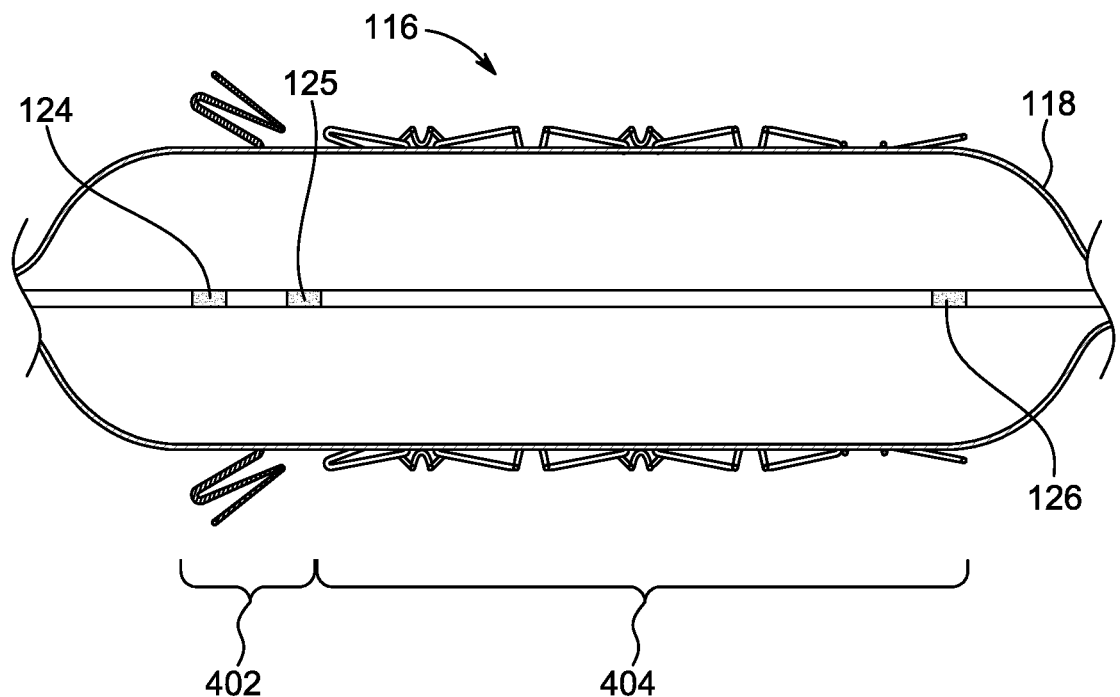

FIG. 5B shows a cross-sectional view of a hybrid stent 116 comprising markers 124, 125 and 126, self-expandable portion 402, balloon-expandable portion 404, and balloon 118. The self-deploying section of the stent 402 is covered by a cleavable cover shown in FIGS. 4A and 4B and is attached at its proximal end to the catheter so that it can be retrieved easily after deployment., so it can be retrieved easily after stent deployment)

Figure 5C:
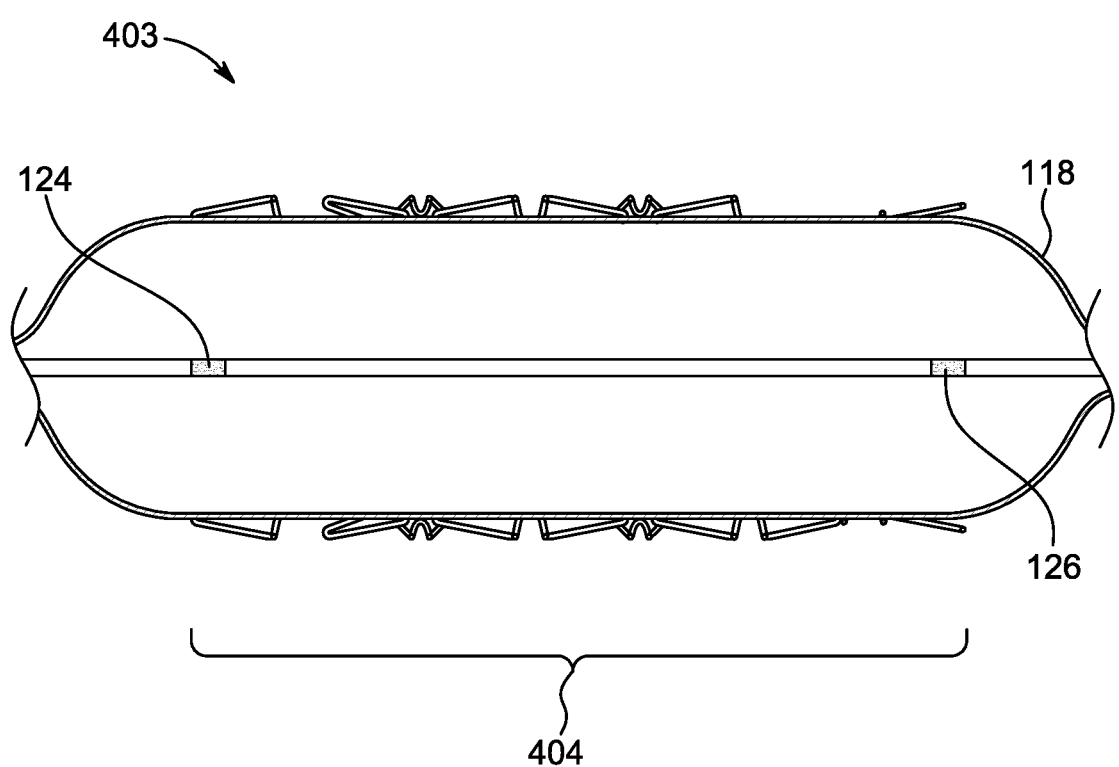

FIG. 5C shows a cross-sectional view of a non-hybrid stent 116 comprising markers 124 and 126 at opposite ends of the stent.

Figure 6A:
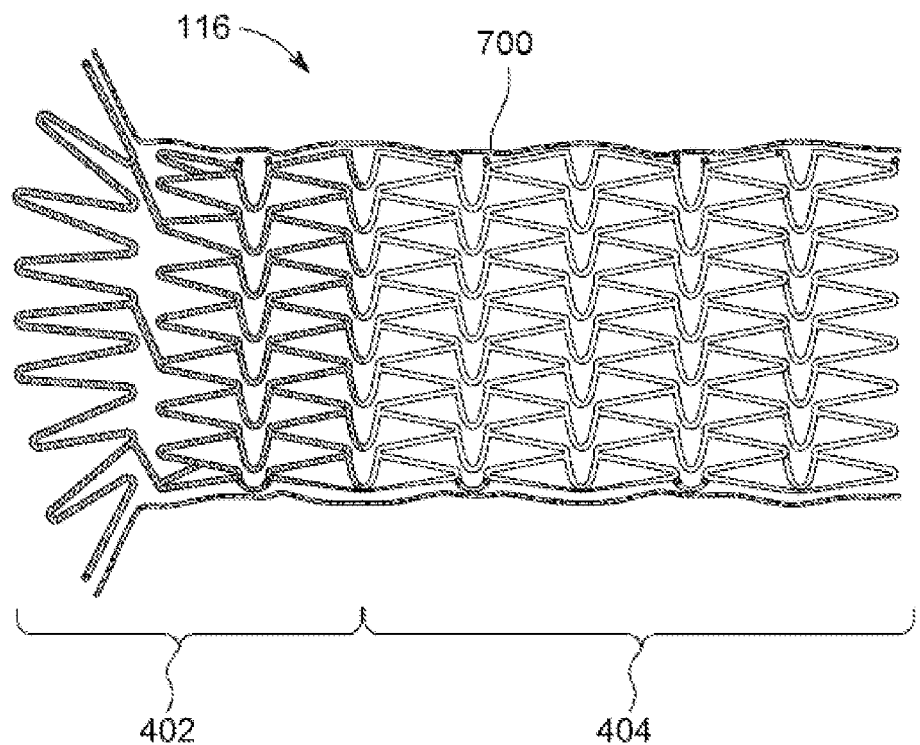

FIG. 6A depicts a deployed stent 116 in vessel 700 comprising self-expanded section 402 (left, dark gray) and balloon-expanded portion 404 (right, light gray). Nitinol makes up the first three layers of struts. In some embodiments, the stent has a drug coating.

Figure 6B:
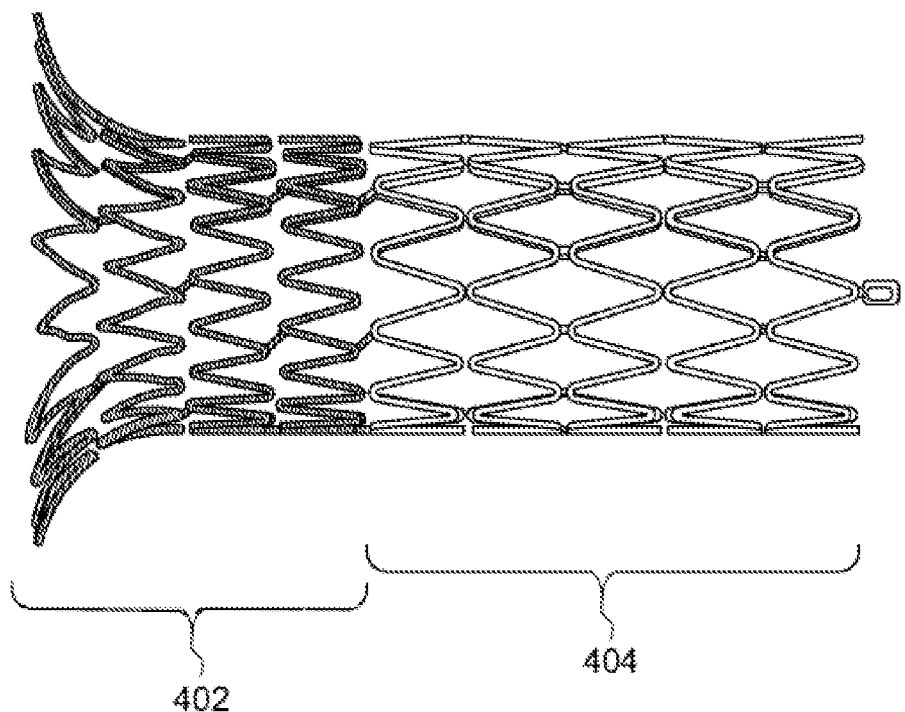

FIG. 6B depicts another embodiment of a deployed stent comprising self-expanding section 402 and balloon-expanded portion 404. In this embodiment, the proximal self-expanding part 402, is made of Nitinol (dark gray) and the balloon-expandable part 404 comprises a balloon-expandable alloy.

In a hybrid stent, usually the self-expanding section 402 and the balloon-expanded section 404 are made of different materials which are connected. However, an anchor or space in 404 for connection to 402 is not required and the hybrid stent is typically a uniform body.

Figure 7:
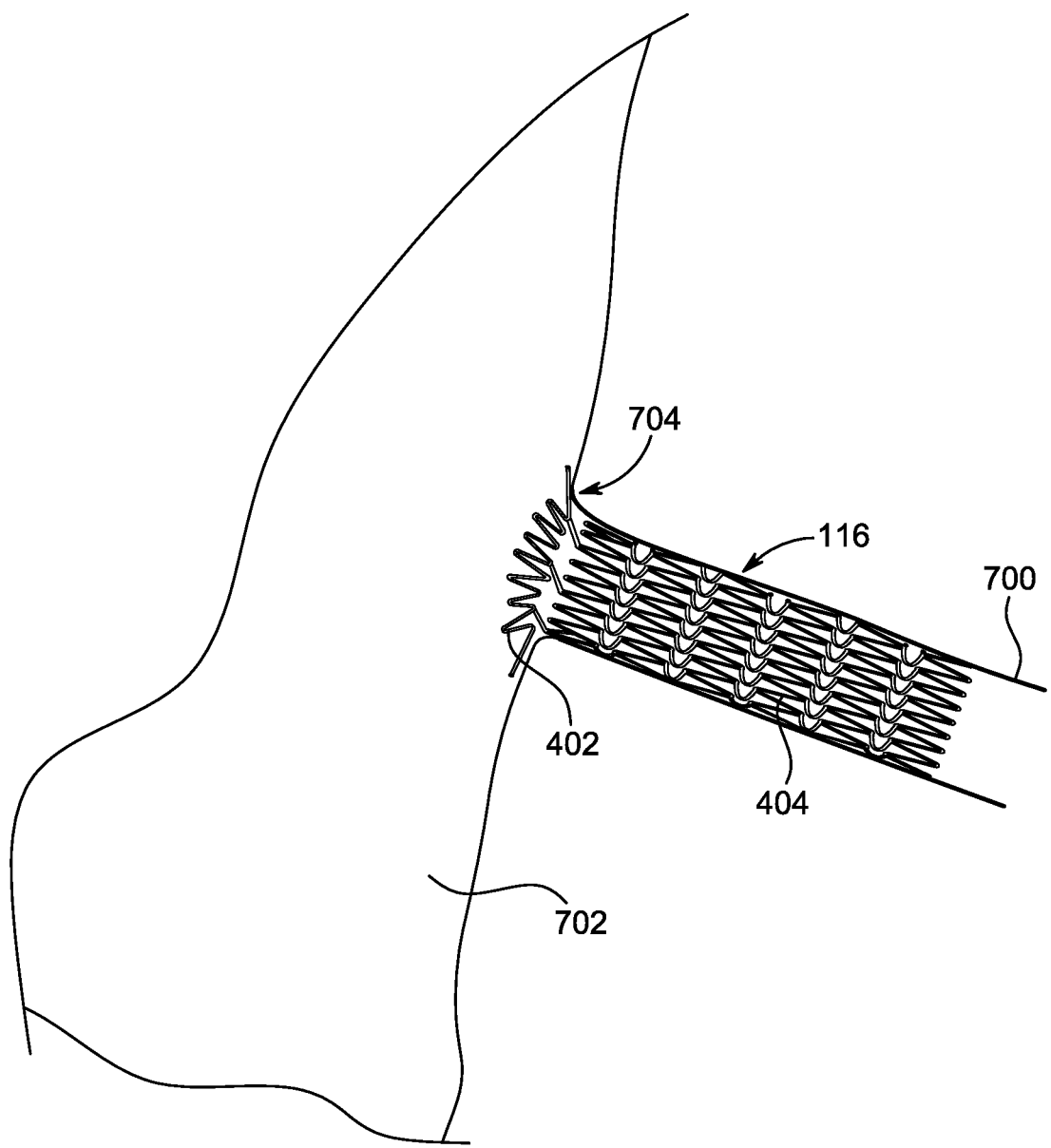

FIG. 7 shows deployed stent 116 in vessel 700 with self-expanding portion 402 in ostium of an aorta 702.

Figure 8:
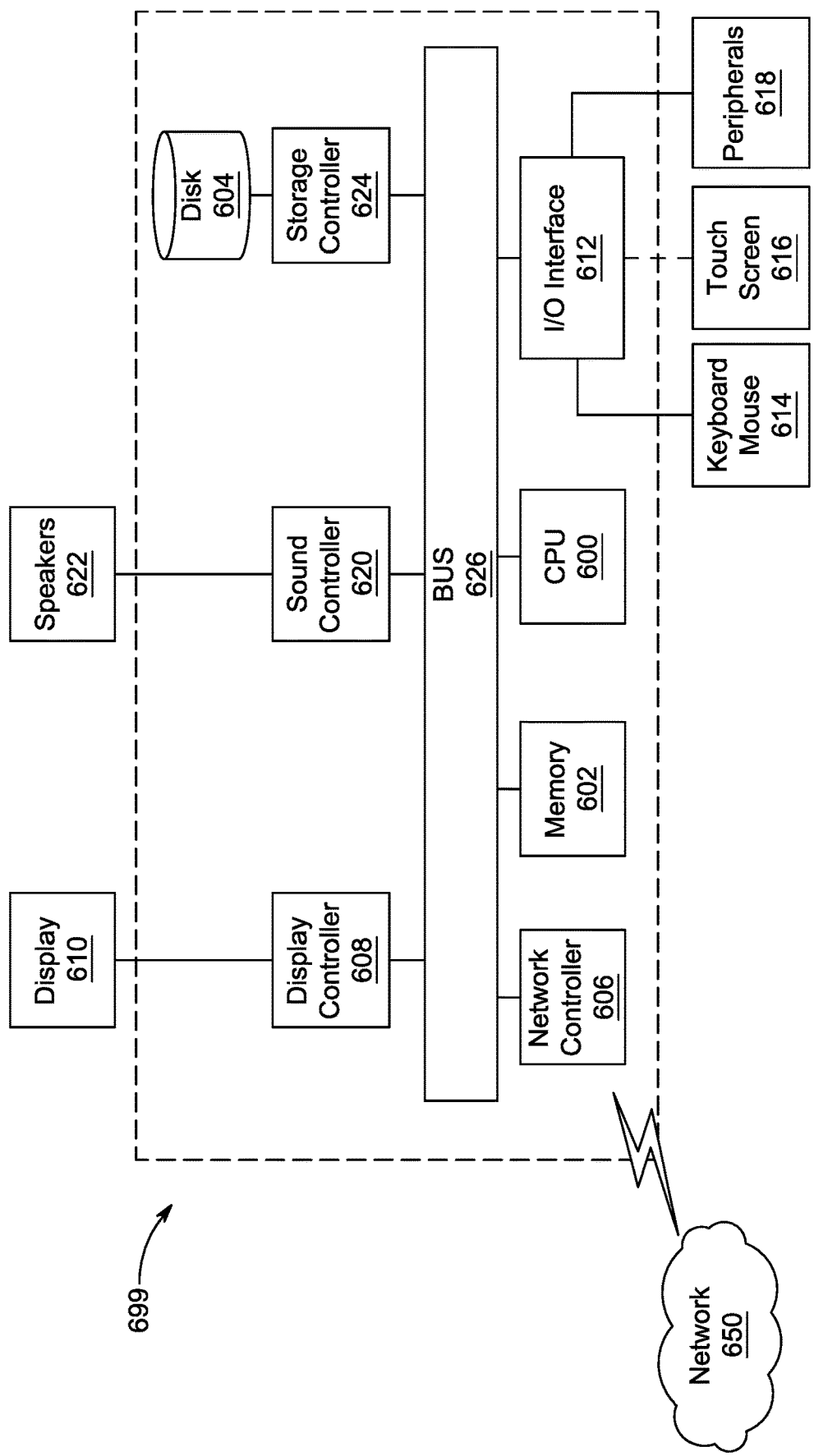

FIG. 8. Depicts data processing, display and output for IVUS.

Figure 9A:
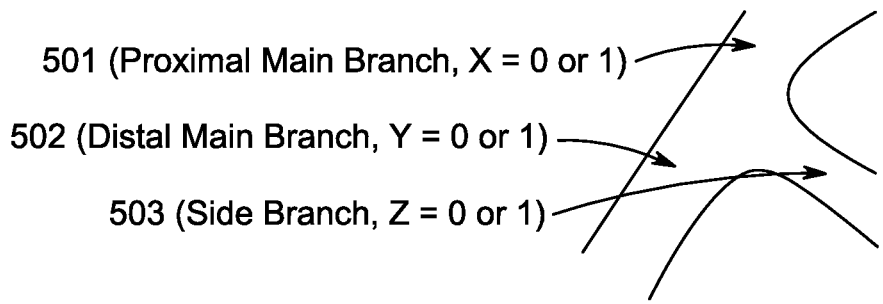

FIG. 9A shows bifurcation sites.

Figure 9B:
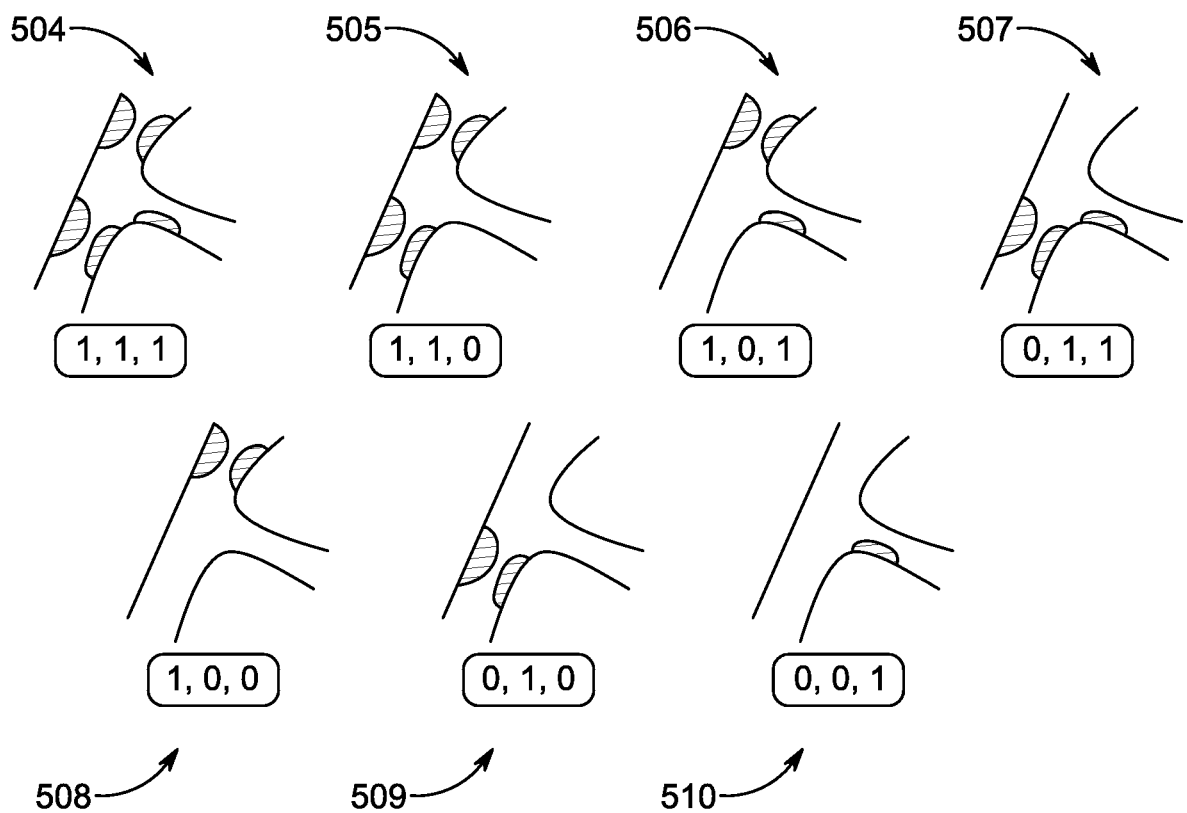

FIG. 9B is a depiction of the Medina Classification for bifurcation lesions.

DETAILED DESCRIPTION OF THE INVENTION

One non-limiting name for the system disclosed herein is the VISION-PRO System. This intravascular system comprises both a stenting apparatus and an intravascular ultrasound transducer enabling a stent to be positioned, deployed and final deployment checked under IVUS vision.

As mentioned above, one aspect of the invention is an intravascular stenting system comprising a catheter having a fluid-filled lumen, a guidewire, at least one, two or three intravascular ultrasound ("IVUS") transducers, and a stent comprising a proximal self-expanding section and a distal balloon-expandable segment; wherein the fluid-filled lumen is operatively connected to an inflation device at its proximal end and connected at its distal end to a balloon inside of the stent (where the balloon, stent, drug coating when present, and cover are parts of the stent assembly); wherein the catheter comprises a guidewire port towards its distal end through which the guidewire extends into a distal portion of the lumen, wherein the lumen comprises one or more fiber optic lines which connect to the IVUS transducer(s) to an interface/image processor and a display device, and wherein the stent is contained within a cover that is cleavable by inflation of the balloon. In preferred embodiments, the lumen is complete filled with a fluid. The outer diameter of the catheter may range from 0.5, 1, 2, 3, 4, 5 to 6 mm and the lumen may have a diameter ranging from 0.25, 0.5, 1, 2, 3 or 4 mm or any intermediate value.

A non-hybrid or hybrid intravascular stenting system comprising a catheter having a fluid-filled lumen, a guidewire, at least one, two or three intravascular ultrasound ("IVUS") transducers, and a stent comprising a proximal self-expanding section and a distal balloon-expandable segment; wherein the fluid-filled lumen is operatively connected to an inflation device at its proximal end and connected at its distal end to a balloon inside of the stent (where the balloon, stent, drug coating when present, and cover are parts of the stent assembly); wherein the catheter comprises a guidewire port towards its distal end through which the guidewire extends into a distal portion of the lumen, wherein the lumen comprises one or more fiber optic lines which connect to the IVUS transducer(s) to an interface/image processor and a display device, and wherein hybrid form the self-expandable form of the stent is contained within a cover that is cleavable by inflation of the balloon. In the hybrid embodiment, the cover further comprises a proximal self-expanding portion typically made of Nitinol which is released when the cover is cleaved by inflation of the balloon.

In a non-hybrid embodiment, a proximal portion of the stent may be also be made of Nitinol and integrally joined with the more distal body of the stent made of a balloon-expandable alloy, or the proximal Nitinol portion may be omitted with only a balloon expandable portion.

Nitinol is not required for a non-hybrid form of the stent. (An intravascular stenting system comprising a catheter having a fluid-filled lumen, a guidewire, at least one, two or three intravascular ultrasound ("IVUS") transducers, and a stent comprising a proximal self-expanding section and a distal balloon-expandable segment; wherein the fluid-filled lumen is operatively connected to an inflation device at its proximal end and connected at its distal end to a balloon inside of the stent (where the balloon, stent, drug coating when present, and cover are parts of the stent assembly); wherein the catheter comprises a guidewire port towards its distal end through which the guidewire extends into a distal portion of the lumen, wherein the lumen comprises one or more fiber optic lines which connect to the IVUS transducer(s) to an interface/image processor and a display device, and wherein the hybrid form the self-expandable part of the stent is contained within a cover that is cleavable by inflation of the balloon.

This system contains a fluid-filled catheter the same or similar as other fluid-filled systems used in this field.

Preferably the system including catheter and stent ranges in length from about 100, 110, 120, 130, 140 to 150 mm and has scale markings on its external surface, for example, markings at 1 mm intervals, to assist the surgeon in inserting, positioning or withdrawing the IVUS or stent.

In some embodiments, the IVUS transducer that forms part of the system comprises a single rotating IVUS transducer; in other embodiments, the IVUS transducer comprises fixed array of at least two, three or four IVUS transducers, such as minitransducer. Preferably a transducer will be selected that minimizes the amount cross-sectional area of the lumen occupied by the optical fibers, for example, so that the optical fibers occupy no more than 50, 40, 30, 20 or 10% of the cross-sectional area of the lumen. The IVUS lines can be operably connected to an interface or processor which processes data from the IVUS transducer into an image and/or a monitor that displays the image.

The IVUS lines may be compatible with any system that carries energy to the transducer for production of ultrasonic waves may be used. A common technology is fiberoptics.

Diameters of the IVUS lines will depend on the technology being used and can be selected by those skilled in the art. Typically, the combined layer carrying these fibers will add 0.25 till 3 mm further outer layer on top of the inner lumen of the balloon catheter.

In some embodiments, the balloon-expandable segment of the stent comprises about 5% to about 95% of the overall length of the stent, preferably about 10% to about 90%, preferably about 15% to about 85%, preferably about 20% to about 80%, preferably about 25% to about 75%, preferably about 30% to about 70%, preferably about 35 to about 65% of the overall length of the stent, the remaining length of the stent comprises the self-expandable trumpet portion. In some embodiments, the stent, including the self-expanding section and balloon-expandable segment, has an overall length of 5.0 to 25.0 mm, preferably 5.5 to 24.5 mm, preferably 6.0 to 24.0 mm, preferably 6.5 to 23.5 mm, preferably 7.0 to 23.0 mm, preferably 7.5 to 22.5 mm, preferably 8.0 to 22.0 mm, preferably 8.5 to 21.5 mm, preferably 9.0 to 21.0 mm, preferably 9.5 to 20.5 mm, preferably 10.0 to 20.0 mm, preferably 10.5 to 19.5 mm, preferably 11.0 to 19.0 mm. In some embodiments, the overall length ranges from 5, 10, 20, 30, or 40 mm. The diameter of the undeployed stent, including the self-expanding section and balloon expandable segment can range from 1, 2, 3, 4 or 6 mm. The diameter of the deployed stent, including the self-expanding section and balloon expandable segment can range from <2, 2, 3, 4, 5, 6, 7, 8, 9, 10 or >10 mm.

When a hybrid stent system is used, the self-expanding section of the stent can flare into a trumpet-shape upon cleavage of the cover and its release with the bell of the trumpet having a deployed diameter at least as large as and preferably larger than the deployed diameter of the balloon-expandable segment. In other embodiments, the deployed self-expanding section may have a diameter less than that of the balloon-expandable segment. The self-expandable portion is typically larger than the balloon-expandable section of the stent as it will be deployed in a main vessel.

Stents are generally classified by the material of their construction into two broad categories: metallic stents and polymer stents. Generally, both the self-expanding section and balloon-expandable segment may be constructed of any suitable material known to one of skill in the art.

Polymer stents are constructed from polymers, particularly polymers of molecules which are naturally-occurring in the human body. Polymer stents are frequently designed to be degraded and absorbed by or excreted from the body after a period of time. Examples of polymers used to fabricate polymer stents are polylactic acid, tyrosine polycarbonate, and poly salicylic acid/adipic acid.

Metallic stents are constructed from metal and metal alloy materials and fall into two categories based upon other materials used in their construction: bare metal stents and polymer coated or drug eluting stents. Polymer coated or drug eluting stents comprise a metal or metal alloy scaffold and a polymer coating, with an optional drug loaded into the polymer coating. Typically, the polymer is a biodegradable or bioabsorbable polymer which is slowly degraded by natural body processes and through the process of being degraded releases the drug into the area and tissue immediately surrounding the stent. For further examples of polymer stents, see Onuma, Y., & Serruys, P. W, CIRCULATION, 2011, 123, 779-797, incorporated herein by reference.

Metallic stents are typically categorized based on the method of expansion. Balloon-expandable stents require an expansion force be applied to the stent to expand from a compressed state for delivery and positioning to an expanded state for treating a lesion. This expansion force is typically applied from an interior surface of the balloon-expandable stent by inflation of a balloon placed in an interior portion of the stent.

Self-expandable stents, in contrast, do not require an expansion force be applied to the stent. Instead, the stent provides its own expansion force as a property of the material of its construction or its geometry. Metallic balloon-expandable stents and metallic self-expandable stents are typically constructed of different metals or metal alloys. Metallic balloon-expandable stents are commonly constructed from stainless steel, particularly 316L stainless steel. Examples of other materials commonly used for metallic balloon-expandable stents are cobalt-chromium alloys (particularly L605 and MP35N), platinum-chromium alloys (typically proprietary compositions), tantalum, platinum-iridium alloys (such as Pt70/Ir30, Pt75/Ir25 Pt80/Ir20, Pt85/Ir15, Pt90/Ir10, and Pt95/Ir5), niobium and niobium alloys (particularly Nb1Zr, Nb28Ta3.5W1.3Zr, and Nb60Ta2Zr), and magnesium alloys (particularly AE21, Mg-2.2Nd-0.1Zn—0.4Zr also known as JDBM, AZ91, AZ31, and WE43). Magnesium alloys are typically chosen for stents designed to be degraded and absorbed by or excreted from the body after a period of time.

Metallic self-expandable stents are commonly constructed from Ni—Ti alloys (e.g., Nitinols®), Co—Cr—Ni alloys (e.g., Elgiloys®), and stainless steel. The self-expansion of self-expandable stents may be due to a property of the material the self-expanding stent is comprised of or due to a property of the stent geometry. Self-expanding stents comprising Elgiloy® or stainless steel, for example, typically self-expand due to a property of the stent geometry.

Alternatively, metallic self-expandable stents are frequently constructed from shape-memory alloys. Shape-memory alloys are named for the ability to "remember" their shape after being plastically deformed. That is, shape-memory alloys, once formed into an original shape, are capable of reverting back to this original shape after being deformed into a final shape, provided the deformation they experience is within a recoverable range. This reversion may be caused by heating or some other external stimulus. The process of deformation and shape recovery can be repeated many times. This property is referred to as the "shape-memory effect". For shape recovery caused by heating, the temperature at which the shape-memory alloy reverts to an original shape may be referred to as the "transition temperature" and is typically dependent upon the composition of the alloy. For metallic self-expandable stents, the transition temperature is typically chosen to be just above or just below normal body temperature (i.e. about 37° C.). Examples of shape-memory alloys are Ni—Ti alloys (Nitinols®), Ag—Cd 44/49 at. % Cd, Au—Cd 46.5/50 at. % Cd, Co—Ni—Al alloys, Co—Ni—Ga alloys, Cu—Al—Be—X(X:Zr, B, Cr, Gd) alloys, Cu—Al—Ni 14/14.5 wt. % Al, 3/4.5 wt. % Ni alloys, Cu—Al—Ni—Hf alloys, Cu—Sn approx. 15 at. % Sn alloys, Cu—Zn 38.5/41.5 wt. % Zn alloys, Cu—Zn—X (X=Si, Al, Sn) alloys, Fe—Mn—Si alloys, Fe—Pt approx. 25 at. % Pt alloys, Mn—Cu 5/35 at. % Cu alloys, Ni—Fe—Ga alloys, Ni—Ti approx. 55-60 wt. % Ni alloys, Ni—Ti—Hf alloys, Ni—Ti—Pd alloys, Ni—Mn—Ga alloys, and Ti—Nb alloys, where at. % refers to atom % an wt. % refers to weight percent. For further examples of metallic stent materials, see Hanawa, T., JOURNAL OF ARTIFICIAL ORGANS, 2009, 12, 73-79, and Menown, I.B.A., et. al., ADV. THER., 2010, 73, 3, both incorporated herein by reference.

In the above and below descriptions, it is important to note that the metals used in the name of an alloy do not constitute an exhaustive list of the elemental composition of the alloy. The name of an alloy is typically indicative of the major or most prevalent elements in the alloy. For example a cobalt-chromium alloy must necessarily contain both cobalt and chromium, but may further comprise other elements as well.

In some embodiments, the expandable stent is a metallic stent. In some embodiments, the balloon-expandable body portion is constructed of a first metal or metal alloy. In some embodiments, the self-expandable trumpet portion is constructed of a second metal or metal alloy. In some embodiments, the first metal or metal alloy is the same as the second metal or metal alloy. In preferred embodiments, the first metal or metal alloy is not the same as the second metal or metal alloy. In some embodiments, the first metal or metal alloy is selected from the group consisting of stainless steel, cobalt-chromium alloys, platinum-chromium alloys, tantalum, platinum-iridium alloys, niobium, niobium alloys, and magnesium alloys. In preferred embodiments, the first metal or metal alloy is a cobalt-chromium alloy. In alternative preferred embodiments, the first metal or metal alloy is a platinum-chromium alloy. In some embodiments, the self-expandable trumpet section self-expands due to a property of the material of which it is constructed. In some embodiments, the self-expandable trumpet section self-expands by a shape-memory effect. In some embodiments, the second metal or metal alloy is a shape-metal alloy. In preferred embodiments, the second metal or metal alloy is a Nitinol® or a generic equivalent.

In some embodiments, the balloon-expandable segment has a cylindrical shape constructed of a first metal or metal alloy, and is compressible thereby forming a compressed cylinder having a compressed diameter in the compressed state, expandable thereby forming an expanded cylinder with an expanded diameter which is larger than the compressed diameter in an expanded state, and having a fixed end and a free end, the self-expandable trumpet portion is constructed of a second metal or metal alloy and has a fixed end connected to the proximal end of the balloon-expandable body portion and a free end, the self-expandable trumpet section is compressible thereby forming a compressed trumpet having a cylindrical shape with a compressed fixed end diameter and a compressed free end diameter, both of which are equal to the compressed diameter of the balloon-expandable segment in the compressed state, and the self-expandable trumpet section is expandable, thereby forming an expanded trumpet having a cylindrically-symmetrical flange shape having an expanded fixed end diameter equal to an expanded diameter of the proximal end of the balloon-expandable body portion and an expanded free end diameter greater than the expanded diameter of the proximal end of the balloon-expandable body portion in the expanded state.

In the hybrid stent embodiment disclosed herein, the design of the trumpet portion may omit hooks which only add bulk to the stent. The design of the body and rest of the stent can be selected by one skilled in the art. Preferably it is an open cell design with more cells at the neck and with a similar design continuing in the rest of the body of the stent. An anchoring part or gap is usually unnecessary because such a stent is balloon-expandable. Any stent design can be used for the body of the stent including an open cell with straight struts with point connector geometry.

In a preferred embodiment, this intravascular stenting system further comprises a drug coating comprising at least one of everolimus, zotarolimus, sirolimus and biolimus or another antiproliferative drug or drug that reduces in-stent restenosis. Such a coating is typically applied to struts or mesh of the stent. Usually the coating slowly elutes a drug and helps prevent intravascular lesions or blockages from re-occurring.

In some embodiments a polymer coating containing a drug, including those mentioned above, to be delivered or delivered as the coating dissolves may be applied to a stent.

Drug eluting stents, their components, and their functions are known in the art and are incorporated by reference to hypertext transfer protocol secure://en.wikipedia.org/wiki/Drug-eluting stent (last accessed Aug. 28, 2020). Typically the outer surface of the catheter is treated or coated to facilitate its insertion into the vasculature. Conventional surface features and coatings are known by those skilled in the art.

In preferred embodiments, the catheter, stent or balloon portion of stent assembly have at least one radiopaque marking. More preferably, the stent has a first radiopaque marking about 0.5 to 1.5 mm distal, preferably 1 mm distal, to the IVUS transducer, a second marking at a proximal edge of the balloon, and a third marking at a distal edge of the balloon. These markings are made at positions most useful to the surgeon for visualizing stent location. In some embodiments these markings may be at the extreme ends of the balloon or at the top of the balloon shoulders. In the system described herein, the proximal balloon shoulders may be designed to be shorter than the distal shoulders to get an IVUS transducer closer to the stent. Usually in a hybrid stent there is another radiopaque marker denoting the junction of self-expandable and balloon expandable segments of the stent.

Another aspect of the invention is a method for treating an ostial or other bifurcation or bifurcating intravascular lesion comprising inserting the intravascular stenting system disclosed herein into the vascular system of a patient, observing or locating the lesion by IVUS, and stenting the lesion by inflating the balloon to cleave the covering, and removing the catheter. This method may further comprise assessing stent placement by IVUS after a stenting procedure.

The present disclosure also relates to a method of stenting a patient in need of percutaneous coronary intervention at an ostium or bifurcation site, comprising placing into a branch of an ostium or bifurcation site the stent delivery assembly such that the balloon-expandable segment is oriented downstream of the ostium or bifurcation site and the self-expanding trumpet segment is located at the ostium or bifurcation site (see FIG. 7), and inflating the balloon to the critical diameter, thereby expanding the balloon-expandable segment and the self-expandable trumpet segment to the critical diameter at which the breakable cover breaks to allow the self-expandable trumpet portion to self-expand.

In non-hybrid embodiments, a balloon-expandable stent without a self-expanding portion may be deployed under IVUS in patients having a condition requiring precise and accurate placement of a stent. In a non-hybrid form, there is no need for a cleavable cover because the stent is expanded or deployed by inflation of the balloon.

The stenting system comprises a tiny ultrasound transducer mounted on the tip of a fluid-filled intravascular catheter with a monorail-type stent delivery system, see FIG. 1. The fluid-filled catheter is operably connected to a balloon which is used to deploy a hybrid stent. The monorail stent delivery system permits the positioning of the stent within the vasculature.

As shown by FIGS. 2A and 2B, the proximal section A-A' of the catheter contains IVUS optical fibers 200 that connect the IVUS transducer to an external processor and imaging device. Depending on the kind of IVUS transducer, the lumen of the catheter may contain 1, 2, 3, 4, 5 or more optical fibers. The more distal cross-section B-B' additionally contains the guidewire 114 used to steer the catheter through the vasculature.

An IVUS catheter can be either a fixed array of mini transducers, or a single rotating transducer. IVUS transducers operate in the 10-20 MHz range and the echo return is sent to an external computer via IVUS fiber optics so that images can be reconstructed on a screen. Such images are usually displayed at about 30 frames/second and provide guidance for the surgeon during a stenting procedure.

Preferably, the IVUS imaging system comprises a scanner assembly (IVUS transducer and related electromechanical elements) with an array of ultrasound transducers and associated control circuitry at the distal end of the catheter. When the scanner assembly is positioned near the area to be imaged, the IVUS transducers are activated and ultrasonic energy is produced. A portion of the ultrasonic energy is reflected by the vessel and the surrounding anatomy and received by the transducers. Corresponding echo information is passed via the optical fibers to an image processor which renders the information as an image for display on a monitor.

The imaging system may use any of a variety of ultrasonic imaging technologies. Accordingly, in some embodiments, the IVUS imaging system is a solid-state IVUS imaging system incorporating an array of piezoelectric transducers fabricated from lead-zirconate-titanate (PZT) ceramic. In other embodiments, the system incorporates capacitive micromachined ultrasonic transducers (CMUTs), or piezoelectric micromachined ultrasound transducers (PMUTs).

FIG. 8 is a block diagram showing an example of an IVUS signal and imaging processing and display to which the optical fibers connected to the IVUS transducer may connect. These elements may receive input from one or more IVUS transducers, process these signals into image data for further analysis or display. Each of the functions of the above described embodiments may be implemented by circuitry, which includes one or more processing circuits. A processing circuit includes a particularly programmed processor, for example, processor (CPU) 600, as shown in FIG. 8. A processing circuit also includes devices such as an application specific integrated circuit (ASIC) and conventional circuit components arranged to perform the recited functions such as analysis, tranmission or display of IVUS signals or data.

In FIG. 8, the device 699 includes a CPU 600 which performs the processes described above including scanning, 3D modelling, model assessment, prototype production and assessment. The device 699 may be a general-purpose computer or a particular, special-purpose machine.

The processed data and instructions may be stored in memory 602. These processes and instructions may also be stored on a storage medium disk 604 such as a hard drive (HDD) or portable storage medium or may be stored remotely. The instructions may be stored on CDs, DVDs, in FLASH memory, RAM, ROM, PROM, EPROM, EEPROM, hard disk or any other device with which the system communicates, such as a server or computer. In other words, the instructions may be stored on any non-transitory computer-readable storage medium to be executed on a computer.

Further, the discussed embodiments may be provided as a utility application, background daemon, or component of an operating system, or combination thereof, executing in conjunction with CPU 600 and an operating system such as, but not limited to, Microsoft Windows, UNIX, Solaris, LINUX, Android, Apple MAC-OS, Apple iOS and other systems known to those skilled in the art.

CPU 600 may be any type of processor that would be recognized by one of ordinary skill in the art. For example, CPU 600 may be a Xenon or Core processor from Intel of America or an Opteron processor from AMD of America. CPU 600 may be a processor having ARM architecture or any other type of architecture. CPU 600 may be any processor found in a mobile device (for example, cellular/smart phones, tablets, personal digital assistants (PDAs), or the like).

As shown in FIGS. 1 and 2B, the device comprises a monorail stent delivery system which is integrated with IVUS. Cross sectional analysis (section B-B') of the monorail part of the catheter show that it has three important structures, see FIGS. 1 and 2B. The catheter has an inner lumen that can accommodate a liquid fluid for inflation of a balloon, IVUS optical fibers, and at is more distal segment a guidewire as shown by FIGS. 2A and 2B. In some embodiments, the outer diameter of the catheter ranges from 0.5, 1, 2, 3, to 4.0 mm and an inner diameter ranging from 0.3 to 3.5 mm. The catheter length is selected so as to reach the target site, for example, it may range in length from 100 to 150 cm. To help guide insertion and placement of a stent, the catheter may have graduations or regular markings on its external surface, for example, every 0.5, 1, or 2 mm.

The optical fibers and guidewire are sized to fit within the lumen, but permit sufficient space for inflation of the balloon via the fluid inside the lumen. Preferably, the optical fibers and/or guidewire do not occupy more than 10, 20, 30, 40, or 50% of the cross-section of the lumen. The size of the catheter depends on the size of the vessels through which it passes. Reference vessel diameters range from 2.0 to 2.25 mm for small vessels, 2.50 to 2.75 for small workhorse vessels, 3.00 to 3.5 mm for workhorse vessels and 4.0 to 10 mm for large vessels. Preferably, the vessel diameter ranges from about 2, 3, 4, 5, 6, 7, 8, 9 to 10 mm.

As shown in FIGS. 2A and 2B, the proximal end of the catheter comprises a fluid filled system connected to an inflation device at a proximal end and to an inflatable balloon at a distal end, and fiber optics for the IVUS. The distal segment of the catheter also comprises a percutaneous coronary intervention ("PCI") guide wire to steer the device to an intravascular target site. As shown by FIG. 1 and FIGS. 2A and 2B, the balloon is open to a lumen that travels along the length of the catheter and ends in an inflation port that connects to an inflation device. The balloon may be selectively inflated and deflated via the inflation port. PCI guidewires are commercially available, for example, from Boston Scientific. A suitable guidewire for a particular stenting procedure may be selected by one skilled in the art. Typically, the usual diameter of the wire is from about 0.009 inches to about 0.014 inches. and can range from about 0.2 to about 0.5 mm.

As shown by FIGS. 1 and 2A, a proximal cross sectional analysis (section A-A') of the catheter reveals that there is a space for two structures the fluid filled system connected to the balloon at one end and to the inflation device at the other and the fiber optics for the IVUS.

In a preferred embodiment, three radiopaque markers are placed on the balloon and on the balloon delivery catheter apart from the IVUS catheter which is in close proximity. In proximal to distal order there are a first marker that is about 1 mm distal to the IVUS at the start of the balloon shoulders, a second marker is at the start of the stent marking the proximal part of the stent which is about 1 mm distal to the first marker and a third most distal marker which marks the distal edge of the stent. Preferably, for a hybrid stent there is a fourth radiopaque marker denoting the junction of self-expandable and balloon expandable stent. Radiopaque markers are metallic structures comprising high atomic number (high-Z) metals which are visible by medical diagnostic techniques such as X-ray imaging or CAT scans. Examples of commonly-used high atomic number metals are tantalum, gold, palladium, platinum, iridium, and mixtures thereof. In some embodiments, the radiopaque markers take the form of bands or rings. In alternative embodiments, the radiopaque markers take the form of discs. In some embodiments, the radiopaque markers are integrated into or attached to the bifunctional expandable stent. In alternative embodiments, the radiopaque markers can be integrated into or attached to a catheter or guidewire to which the bifunctional expandable stent delivery assembly is attached. For examples of radiopaque markers, see U.S. Pat. No. 9,693,885 B2 and U.S. Pat. No. 6,334,871 B1 which are both incorporated by reference.

As previously described, one embodiment of the stent is a simple, non-hybrid system comprising IVUS and a conventional balloon expandable stent. Such a system typically does not have a self-expanding nitinol section having a cleavable covering.

Another embodiment is a hybrid stent system comprising IVUS. This system deploys a hybrid stent which comprises a self-expanding section and a balloon-expandable segment. In an undeployed form, this self-expandable part of the hybrid stent is encompassed by, covered or wrapped with a cleavable platinum, alloy or plastic cover and contains an inflatable balloon, see FIGS. 4A-4B. The cleavable cover most of, preferably the entire self-expanding portion of the stent and optionally some part of the balloon expandable stent. The cleavable cover is attached proximally to the catheter and fully retrievable. The stent is composed of at least the self-expanding section 402 and balloon-expandable segment 404 but may contain additional elements.

The self-expanding and balloon-expandable parts of the stent are made of materials known in the art. Preferably, they comprise platinum or a metal alloy such as cobalt-chromium. The cleavable cover advantageously may comprise a memory metal such as nickel-titanium (Nitinol®).

The self-expanding section of the stent is constrained in a deliverable form by a cleavable cover unlike more bulky deployment devices using retractable sheaths. The cover is cleaved by expansion of the balloon during deployment of the balloon-inflatable portion of the stent. This feature makes the device less bulky and makes stent deployment simpler by eliminating the need for complex release machinery. Moreover, it makes the stent as disclosed herein more versatile as stent delivery is less complex, requiring only balloon inflation for both the self-expanding and inflatable parts of a stent, and facilitating delivery to vascular side-branches especially those already jailed by a stent or where the side-branches are more angulated or calcium containing plaque where more bulky stents delivered by retractable means cannot reach.

Inflation of the balloon cleaves the cover and deploys the balloon expandable portion by expansion due to interior radial force. More specifically, a stent for transluminal implantation usually comprises cylindrical parts preferably in juxtaposition with at least one part being self-expanding upon cleavage of its cover and another part which requires an interior radial force for its expansion such as a balloon catheter or the like. Inflation pressure can vary depending on the kind of balloon and its length and diameter. In some embodiments, nominal inflation pressure ranges from about 6, 7, 8, 9, 10, 11, 12, 13,14, 15 to 16 atm. Its burst rated pressure is usually balloon specific and typically ranges from 14 to 22 atm. Burst inflation pressure ranges from about 15 to 20 atm. In some embodiments, balloon diameter will range from about 1, 2, 3, 4, to 5 mm and balloon length from 5, 10, 15, 20, 25, 30 to 35 mm.

Upon inflation of the balloon via an inflation device attached to the proximal end of the lumen in the catheter the self-expanding section expands into a trumpet shape and substantially simultaneously, the balloon-expandable portion of the hybrid catheter expands, see FIGS. 5A and 5B. In some alternative embodiments, the cleavable covering upon inflation of the balloon may be designed to release either the proximal or distal part of the stent first.

An example of a simple, non-hybrid balloon-expandable stent system with IVUS is shown by FIGS. 3A and 5C.

One example of the deployed form of the hybrid catheter is shown by FIG. 7B which shows a trumpet-shaped part deployed across an ostium of a parent vessel and the balloon-expandable part deployed in a side- or daughter vessel. Once deployed, the balloon is deflated and can be removed along with residual portions of the now-cleaved covering and the catheter.

Preferably, the stent is a drug coated stent or drug eluting stent which can reduce the risk of subsequent in stent restenosis. Drug eluting stents consist of a metallic scaffold which is usually alloys of different combinations of cobalt, chromium and platinum or Nitinol® or elemental platinum and an elutable drug dispersed in a polymer matrix that surrounds the struts by conforming to it. The drug coating may comprise one or more antimetabolites or other compounds that slowly release a drug and block cellular proliferation. Drugs include, but are not limited to sirolimus, paclitaxel, everolimus and zotarolimus. Preferably, the drug is, in order of preference, everolimus, zotarolimus, sirolimus or biolimus.

Biostable polymers can be used to bind the drug to the stent and control the rate of elution of the drug into the arterial tissue. A variety of polymers are available in the market; polymers can be bio-absorbable or durable polymers. Some examples include durable polymers like fluoropolymers, PMBA or poly (n-butyl methacrylate), or bio-absorbable polymer such as those made of PLLA, poly-L-lactic acid or PLGA, poly (lactic-co-glycolic) acid. Types, components, and dosages of stent coatings suitable for use in the stents disclosed herein are incorporated by reference to Ma, et al., *Drug-eluting stent coatings*, INTERV. CARDIOL. 2012, 4(1), 73-83. In some alternative embodiments, the stent comprises the metallic components described above, may comprise a coating, but does not have a polymer coating containing a drug.

Cleavable cover. The cleavable (or breakable) cover fits over the self-expanding section and optionally may fit over the balloon-expandable portion to facilitate simultaneous release of both parts of the stent. In some embodiments, the cover fits only over the self-expanding section or trumpet-cleavable cover provides a compressive effect thereby maintaining the self-expanding (trumpet-forming) section in a compressed state. In some embodiments, removal of the cleavable cover, allows the self-expanding section to self-expand into a trumpet shape. The cover may be constructed of any suitable material known to one of ordinary skill in the art. Examples of such suitable materials include polymers and metals as described herein. The cleavable cover is broken by inflation of the balloon and subsequent expansion of the balloon-expandable segment. Upon inflation of the balloon and expansion of the balloon-expandable segment beyond a critical diameter, the breakable cover breaks, thereby allowing the self-expanding portion to self-expand. In some embodiments, the cover is configured to be maintained at the critical diameter, such that any expansion or inflation of the balloon causes the breakable cover to break. In alternative embodiments, the cleavable cover is maintained at a diameter below the critical diameter (a sub-critical diameter). In such embodiments, the cleavable cover is able to expand to the critical diameter, beyond which it breaks. In such embodiments, the cover is able to reversibly expand from the sub-critical diameter to the critical diameter (but not beyond) and back.

In some embodiments, the cleavable cover fits over the entirety of the self-expandable trumpet portion. In such embodiments, the cover has a length equal to the self-expanding section (or trumpet shape forming portion). In alternative embodiments, the cover does not fit over the entirety of the self-expanding section. In general, the cleavable cover fits over a sufficient portion of the self-expanding section to provide sufficient compressive force to maintain the self-expanding section in a compressed state. In some embodiments, the cleavable cover fits over at least 10%, preferably at least 15%, preferably at least 20%, preferably at least 25%, preferably at least 30%, preferably at least 35%, preferably at least 40%, preferably at least 45%, preferably at least 50%, preferably at least 55%, preferably at least 60%, preferably at least 65%, preferably at least 70%, preferably at least 75% of the self-expanding section. In such embodiments, the cover is positioned such that the free end of the self-expanding section is covered by the cleavable cover. In such embodiments, the portion of the self-expanding section portion not covered by the cover extends from the cleavable cover to the fixed end of the self-expanding section.

In some embodiments, the cleavable cover has an inner diameter which is about equal to an outer diameter of the self-expanding section. In such embodiments, an inner surface of the cover is in contact with an outer surface of the stent in the compressed state. In some embodiments, the cleavable cover has cleavable cover has a capped-cylindrical shape.

In some embodiments, the cover is constructed of a polymer. In some embodiments, the polymer is a durable polymer as described above. In alternative embodiments, the polymer is a biodegradable or bioresorbable polymer as described above. In some embodiments, the breakable cover comprises breaking facilitating structures. These breaking facilitating structures are elements of the structure of the breakable cover which facilitate breaking. Examples of the method by which these breaking facilitating structure facilitate breaking include a reduction of the magnitude of a breaking force or the introduction of a cleavable cover expansion force. In order for the breakable cover to break, a breaking force of sufficient force must be supplied that breaks the cover when it exceeds the critical diameter. In some embodiments, the breaking force is provided by the inflation of the balloon. In some embodiments, the reduction of the magnitude of the breaking force is accomplished by thinning, scoring, and/or perforating the breakable cover. The thinning, scoring, and/or perforating preferably creates thinned, scored, and/or perforated sections of the cleavable cover which have a lower measure of mechanical strength or integrity (such as fracture toughness) compared to sections of the cover which are not thinned, scored, or perforated. In some embodiments, fractures may initiate in sections which are thinned, scored, and/or perforated. In such embodiments the fractures may propagate through the sections which are thinned, scored, and/or perforated preferentially compared to sections which are not thinned, scored, and/or perforated.

In some embodiments, the cleavable cover is permanently attached to the hybrid expandable stent. In such embodiments, the cover remains attached to the stent when the stent is in an expanded state. Such embodiments prevent the cleavable cover from entering the blood stream. In alternative embodiments, the breakable cover is released from the hybrid expandable stent during stent deployment. The proximal ends of the breakable cover can be securely attached to the delivery catheter and once the stent is deployed, it can be safely withdrawn from the body. In such embodiments, the cleavable cover may be retrieved after stent deployment. The cleavable (or breakable) cover, once broken, may be temporarily held by the hybrid expandable stent so as to not enter the blood stream. In such embodiments, the cover may be retrieved and removed from the body by any suitable method or with any suitable device known to one of ordinary skill in the art, such as a laparoscopic tool or catheter. In alternative embodiments, the cover is not retrieved after stent deployment. In such embodiments, the cover is biodegraded or bioresorbed. In such embodiments, cleavable cover is constructed of a biodegradable or bioresorbable polymer as described above. Alternatively, the breakable cover may be attached to a catheter or guidewire that the bifunctional stent delivery assembly is attached to or disposed upon. In such embodiments, the breakable cover, once broken, is removed by an action of removing the catheter or guidewire.

During installation of a hybrid stent comprising the self-expanding section and balloon-expandable segment, the IVUS permits the device to image the interior of the vasculature or blood vessels and to assess vessel or lumen diameter, the length of a lesion, and the amount of plaque build-up in a vessel and composition or condition of a lesion or surrounding vessel wall. Moreover, it permits stent placement under vision and after stent installation, it permits the surgeon/operator to assess the proper placement of a stent and effectiveness of a balloon angioplasty.

To install a stent using the system disclosed herein, a physician uses a guidewire, preferably a guidewire about 0.36 mm in diameter, or within a range of above 0.2 to 0.5 mm, to intravascularly feed the IVUS-tipped catheter over the guidewire to the target site, A monorail stent delivery system usually comprises a short, distal monorail with an exit port for the PCI guide wire 114 as shown by FIG. I. The installation is guided by angiography as the IVUS-tipped catheter is inserted to a target area of the vessel to be imaged. The two proximal markers on the system disclosed herein in combination with the scale markings on the outside of the catheter which permit visible graduation of stent insertion The IVUS system then identifies an area where stent needs to be deployed. When the IVUS is at the ostium, the operator can first check movement due to respiration and cardiac contractions, then perform standard maneuvers to reduce or eliminate these unwanted movements. Finally the operator will pull the catheter according to the distance between the IVUS transducer and the radiopaque markers which is typically about 1 to 3 mm, preferably, about 2 mm, guided by the outside graduation and deploy the stent when satisfied with its positioning and other vascular conditions. Typically, the IVUS tip is placed past the stenotic area to he imaged and is then pulled back through the area of stenosis. The catheter and stent are then positioned under IVUS vision at the deployment site. The catheter is withdrawn 2, 3, 4, 5, 6 to 7 mm, depending on the design, from that point allowing the self-expandable trumpet-like part to deploy around the ostium where the about 2, 3, 4, 5, 6 to −7 mm distance is the distance between the IVUS transducer and the proximal end of the stent. This action is guided by the 1 mm scale on the graduated catheter.

Preferably the stent as disclosed herein has a single self-expanding section made of a material such as Nitinol® only at is proximal end and a single balloon-expandable part only at the distal portion.

In most embodiments, the stent delivery system has only a single stent which comprises different sections joined together, but not containing areas where two stents overlap. This design facilitates the treatment of bifurcation lesions.

The stent as disclosed herein is not classified as a conventional covered stent such as a stent covered with a biocompatible fabric or graft material, but as a stent with a cleavable cover.

However, as mentioned above the stent or one both stent segments, may have a drug-coating to reduce the risk of subsequent in-stent restenosis.

The present disclosure also relates to a method of stenting a patient in need of percutaneous coronary intervention at a bifurcation site, comprising placing into a branch of a bifurcation site the bifunctional expandable stent delivery assembly described above such that the balloon-expandable body portion is oriented downstream of the bifurcation site and the self-expandable trumpet portion is located at the bifurcation site and inflating the balloon to the critical diameter, thereby expanding the balloon-expandable body portion and the self-expandable trumpet portion to the critical diameter at which the breakable cover breaks to allow the self-expandable trumpet portion to self-expand.

A bifurcation site in need of stenting is typically classified based on the location of one or more lesions or areas that must be covered by the stent or stents. One such classification scheme is the Medina Classification. An overview of the Medina Classification is shown in FIGS. 9A and 9B. The Medina Classification uses a nomenclature (X, Y, Z), where X=0 or 1, Y=0 or 1, and Z=0 or 1 based on the presence (1) or absence (0) of a lesion or area that must be covered by the stent in three locations associated with the bifurcation. The proximal main branch is designated with the X variable (501), the distal main branch is designated with the Y variable (502), and the side branch is designated with the Z variable (503). This leads to 7 possible Medina Classifications, which are shown in FIG. 9B. The (1,1,1) classification (504) shows lesions in all three areas. The (1,1,0) classification (505) shows lesions in the proximal and distal main branches but not in the side branch. The (1,0,1) classification (506) shows lesions in the proximal main branch and side branch but not in the distal main branch. The (0,1,1) classification (507) shows lesions in the distal main branch and side branch but not in the proximal main branch. The (1,0,0) classification (508) shows only a lesion in the proximal main branch. The (0,1,0) classification (509) shows only a lesion in the distal main branch. The (0,0,1) classification (510) shows only a lesion in the side branch.

In preferred embodiments, the method treats bifurcation sites comprising a side branch lesion. In preferred embodiments, the bifurcation site has a bifurcation lesion having a Medina Classification of (X, Y, 1), where X=0 or 1 and Y=0 or 1. In such embodiments, the balloon-expandable body portion is oriented in a side branch of the bifurcation site and the self-expandable trumpet portion is located at the carina of the bifurcation site. The carina of a bifurcation site is the inflection point where the bifurcation occurs (i.e. where the parent branch splits into the two daughter branches). In general, any suitable method of placing the hybrid stent delivery assembly known to one of skill in the art may be used.

The device and system as disclosed herein integrates the IVUS, monorail and hybrid stent technologies into a single unit. The inbuilt intravascular ultrasound provides simultaneous assessment at the times of stent placement and deployment, especially in complex cases mentioned above. A majority of lesions to be treated will be aorto-ostial or very proximal. Therefore, while the integration of an intravascular ultrasound transducer system increases the bulk and deliverability of a stent this should not be an impediment to its use in a majority of these cases.

The integration of IVUS into the stent system described herein permits the surgeon to more accurately place the stent under vision. In-stent restenosis is frequent in ostial lesions and requires repeat intervention increasing risk and costs. The system disclosed herein reduces the risk of insufficient coverage of a lesion or too much overhang of a stent over a lesion. Excessive overhand can lead to deformed struts in a stent placing a patient at risk of stent thrombosis.

Terminology. Terminology used herein is for the purpose of describing particular embodiments only and is not intended to be limiting of the invention.

As used herein, a "stent" means any device or structure that adds rigidity, expansion force, or support to a prosthesis. Stents typically have a cylindrical frame. For coronary artery stenting, the stent must apply sufficient radial force on the wall of a diseased coronary artery so that the vessel lumen is restored to a near normal diameter whilst subsequently scaffolding the vessel and preventing collapse of the artery in the longer term.

Related to, but distinct from stents are stent grafts. A "stent graft" refers to a prosthesis comprising a stent and a graft material associated therewith that forms a lumen through at least a portion of the length of the stent. A "graft" is a cylindrical liner that may be disposed on the stent's interior, exterior or both. A wide variety of attachment mechanisms are available to join the stent and graft together, including but not limited to, sutures, adhesive bonding, heat welding, and ultrasonic welding.

As used herein, a "catheter" is an apparatus that is connected to a deployment mechanism and houses a medical device that can be delivered over a guidewire. The catheter may include a guidewire lumen for over-the-wire guidance and may be used for delivering a stent or stent graft to a target site. A catheter can have braided metal strands within the catheter wall for structural improvements. The structural elements of the catheter tip can be bonded or laser welded to the braided strands of the catheter to improve the performance characteristics of the catheter tip.

As used herein, a "guidewire" is an elongated cable comprised of various biocompatible materials including metals and polymers. Guidewires may be used for selecting target lumens and guiding catheters to target deployment locations. Guidewires are typically defined as wires used independently of other devices that do not come as part of an assembly.

As used herein, a "balloon" refers to a flexible inflatable container capable of increasing its volume upon inflation with a fluid and decreasing its volume upon deflation.

As used herein, a "bifurcation site" refers to a location in an artery or other bodily vessel where the vessel splits from one parent vessel into two daughter vessels (bifurcates). A bifurcation site comprises a proximal main branch (referring to the parent vessel before or upstream of the bifurcation site), a distal main branch (referring to the larger of the two daughter vessels after or downstream of the bifurcation site), and a side branch (referring to the smaller of the two daughter vessels after or downstream of the bifurcation site).

As used herein, an "ostium" is a small opening, especially one of entrance into a hollow organ, such as an opening from a parent vessel into a side- or daughter vessel.

As used herein, the singular forms "a", "an" and "the" are intended to include the plural forms as well, unless the context clearly indicates otherwise.

As used herein, the term "and/or" includes any and all combinations of one or more of the associated listed items and may be abbreviated as "/".

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all subranges subsumed therein.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Spatially relative terms, such as "under", "below", "lower", "over", "upper", "in front of" or "behind" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

The invention claimed is:

1. An intravascular stenting system comprising:
   a catheter having a fluid-filled lumen,
   a guidewire,
   at least one intravascular ultrasound ("IVUS") transducer, and
   a stent comprising a balloon-expandable segment on a balloon;
   wherein the fluid-filled lumen is operatively connected to an inflation device at its proximal end and at its distal end to the balloon inside of the balloon-expandable segment of the stent;
   wherein a distal segment of the catheter comprises a guidewire port through which the guidewire extends into a distal portion of the fluid-filled lumen, and
   wherein the fluid-filled lumen comprises one or more fiber optic lines operably connected to the at least one IVUS transducer, and
   wherein the catheter further comprises 1 mm scale markings on its external surface.

2. The intravascular stenting system of claim 1, wherein the stent further comprises a proximal self-expanding section, which may comprise a cover, and a distal section comprising the balloon-expandable segment on the balloon; and wherein the stent is configured to deploy by inflation of the balloon.

3. The intravascular stenting system of claim 2, wherein the balloon-expandable segment and self-expanding section of the stent have an undeployed diameter ranging from 1 to 6 mm and a deployed diameter ranging from 2 to 8 mm, and together have a length ranging from 5 to 60 mm.

4. The intravascular stenting system of claim 2, wherein the self-expanding section of the stent comprises nickel-titanium.

5. The intravascular stenting system of claim 2, wherein the cover for the self-expanding section of the stent is cleavable and comprises platinum or a platinum alloy.

6. The intravascular stenting system of claim 2, wherein the self-expanding section of the stent is configured to flare into a trumpet-shape that has a proximal trumpet bell portion having a larger diameter than the balloon-expandable segment.

7. The intravascular stenting system of claim 1, wherein the stent further comprises a drug coating comprising at least one selected from the group consisting of everolimus, zotarolimus, sirolimus and biolimus, or a drug that reduces in-stent restenosis.

8. The intravascular stenting system of claim 1, wherein the catheter or stent has at least one radiopaque marking.

9. The intravascular stenting system of claim 1, wherein the at least one IVUS transducer comprises a single rotating IVUS transducer.

10. The intravascular stenting system of claim 1, wherein the catheter comprises a fixed array of at least two IVUS transducers.

11. The intravascular stenting system of claim 1, wherein the balloon is longer than the stent and has ends that protrude beyond a length of the stent.

12. The intravascular stenting system of claim 1, wherein the one or more fiber optic lines are operably connected to an interface which processes data from the at least one IVUS transducer into an image and/or a monitor that displays the image.

13. A method for treating an ostial or other bifurcated intravascular lesion, comprising:
   inserting the intravascular stenting system of claim 1 into a vascular system of a patient,
   observing or locating the lesion by IVUS,
   stenting the lesion by inflating the balloon and when a self-expandable section and covering are present, to cleave the covering of the self-expanding section, and removing the catheter.

14. The method of claim 13, further comprising assessing stent placement by IVUS after deployment of the stent.

15. The method of claim 13, further comprising implanting the stent in a daughter-vessel ostium followed by stenting of the parent-vessel across the daughter-vessel.

16. The method of claim 13, wherein the lesion is an aorto-ostial or more proximal lesion.

17. The method of claim 13, wherein the stent has a drug coating comprising at least one selected from the group consisting of everolimus, zotarolimus, sirolimus and biolimus, or a drug that reduces in-stent restenosis.

18. An intravascular
stenting system comprising:
   a catheter having a fluid-filled lumen,
   a guidewire,
   at least one intravascular ultrasound ("IVUS") transducer, and
   a stent comprising a balloon-expandable segment on a balloon;

wherein the fluid-filled lumen is operatively connected to an inflation device at its proximal end and at its distal end to the balloon inside of the stent;

wherein a distal segment of the catheter comprises a guidewire port through which the guidewire extends into a distal portion of the fluid-filled lumen, wherein the fluid-filled lumen comprises one or more fiber optic lines operably connected to the at least one IVUS transducer, and wherein the catheter has an outer diameter ranging from about 0.5 to 4.0 mm and an inner lumen diameter ranging from about 0.3 to 3.5 mm, wherein the one or more fiber optic lines range in diameter from 0.1 to 0.5 mm, and wherein the guidewire ranges in diameter from 0.2 to 0.5 mm.

19. An intravascular stenting system comprising:

a catheter having a fluid-filled lumen, a guidewire, at least one intravascular ultrasound ("IVUS") transducer, and a stent comprising a balloon-expandable segment on a balloon;

wherein the fluid-filled lumen is operatively connected to an inflation device at its proximal end and at its distal end to the balloon inside of the stent;

wherein a distal segment of the catheter comprises a guidewire port through which the guidewire extends into a distal portion of the fluid-filled lumen, wherein the lumen comprises one or more fiber optic lines operably connected to the at least one IVUS transducer, and wherein the stent has a first radiopaque marking about 0.5 to 1.5 mm distal to the at least one IVUS transducer, a second radiopaque marking at a proximal edge of the balloon, and a third radiopaque marking at a distal edge of the balloon; and when a proximal self-expanding section is present, a radiopaque marker on the catheter at a junction between the proximal self-expanding segment and the balloon-expandable segment.

* * * * *